(12) United States Patent
Seok

(10) Patent No.: US 10,601,331 B2
(45) Date of Patent: Mar. 24, 2020

(54) FORWARD CONVERTER WITH SELF-DRIVEN BJT SYNCHRONOUS RECTIFIER

(71) Applicant: Littelfuse, Inc., Chicago, IL (US)

(72) Inventor: Kyoung Wook Seok, Milpitas, CA (US)

(73) Assignee: Littlefuse, Inc., Chicago, IL (US)

( * ) Notice: Subject to any disclaimer, the term of this patent is extended or adjusted under 35 U.S.C. 154(b) by 817 days.

(21) Appl. No.: 14/954,747

(22) Filed: Nov. 30, 2015

(65) Prior Publication Data

US 2019/0252990 A1    Aug. 15, 2019

Related U.S. Application Data

(63) Continuation of application No. 14/083,055, filed on Nov. 18, 2013, now Pat. No. 9,263,959.

(51) Int. Cl.
*H02M 3/335* (2006.01)

(52) U.S. Cl.
CPC ... *H02M 3/33592* (2013.01); *H02M 3/33553* (2013.01); *Y02B 70/1475* (2013.01)

(58) Field of Classification Search
CPC ............ H02M 3/22; H02M 3/24; H02M 3/28; H02M 3/325; H02M 3/335; H02M 3/33507; H02M 3/33523; H02M 3/33553; H02M 3/33592; H02M 3/33576; H02M 3/3353; H02M 3/33538; H02M 3/33546; H02M 3/33569; H02M 3/338; H02M 3/3381; H02M 3/3385; H02M 3/1588; H02M 3/46; H02M 3/315; H02M 3/33584; H02M 2001/0048; H02M 2001/0051; H02M 2001/0054; H02M 7/00; H02M 7/02; H02M 7/04; H02M 7/043; H02M 7/06; H02M 7/066; H02M 7/12; H02M 7/21;
(Continued)

(56) References Cited

U.S. PATENT DOCUMENTS 3,667,028 A * 5/1972 Leufgen ................. G01R 19/22
                                                            363/127
3,735,235 A * 5/1973 Hamilton ............ H02M 3/3378
                                                             363/26
(Continued)

*Primary Examiner* — Jeffrey A Gblende
*Assistant Examiner* — Carlos O Rivera-Perez

(57) ABSTRACT

An AC-to-DC converter circuit includes DC-to-DC converter that in turn includes a secondary side circuit. The secondary side circuit includes a secondary winding, a pair of bipolar transistor-based self-driven synchronous rectifiers, a pair of current splitting inductors, and an output capacitor. Each of the synchronous rectifiers includes a bipolar transistor and a diode whose anode is coupled to the transistor collector and whose cathode is coupled to the transistor emitter. The current splitting inductors provide the necessary base current to the bipolar transistors at the appropriate times such that the bipolar transistors operate as synchronous rectifiers. As compared to using conventional self-driven synchronous rectifiers based on field effect transistors in the secondary side, using the novel bipolar-transistor based synchronous rectifiers in the secondary side of the forward converter circuit results in lower power consumption and allows the converter to operate from a wider range of VAC input voltages.

12 Claims, 16 Drawing Sheets

ZERO VOLTAGE SWITCHING PHASE SHIFT FULL-BRIDGE CONVERTER WITH SELF-DRIVEN BJT SYNCHRONOUS RECTIFIER

(58) Field of Classification Search
CPC ........ H02M 7/217; Y02B 70/10; Y02B 70/14; Y02B 70/1458; Y02B 70/1475; Y02B 70/1416; Y02B 70/1433
USPC .... 363/15–21.18, 37, 40–48, 61, 81, 82, 84, 363/89, 95–98, 123–134; 323/21.04, 323/21.06, 21.12, 21.14, 44–48, 127, 364, 323/271, 274, 282; 257/565–596
See application file for complete search history.

(56) References Cited

U.S. PATENT DOCUMENTS

| | | |
|---|---|---|
| 6,421,262 B1 | 7/2002 | Saxelby et al. |
| 6,621,722 B1 | 9/2003 | Yu |
| 2003/0063484 A1* | 4/2003 | Carsten ............ H02M 3/33592 363/127 |
| 2005/0007082 A1 | 1/2005 | Bretz et al. |
| 2012/0176827 A1 | 7/2012 | Malinin |

* cited by examiner

FORWARD CONVERTER

FORWARD CONVERTER (SHALLOW CONTINUOUS CONDUCTION MODE OPERATION)

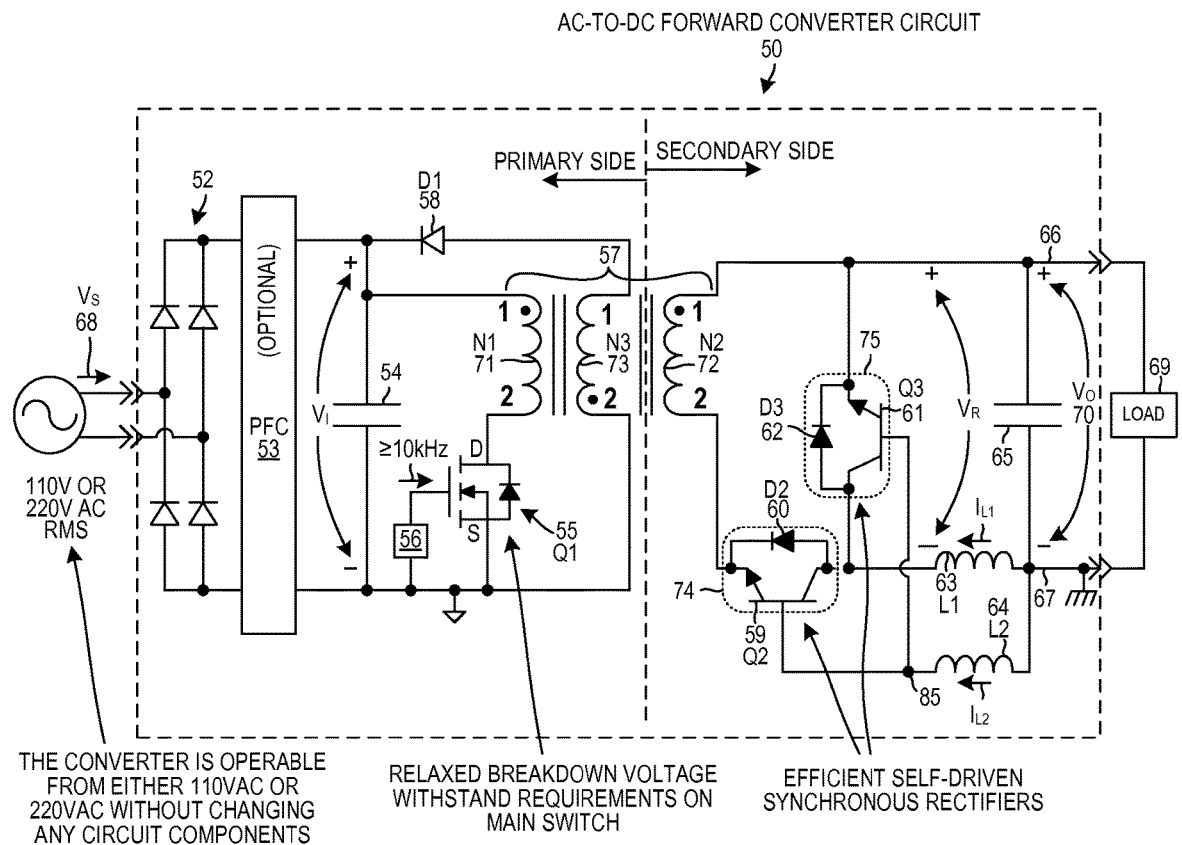

**FORWARD CONVERTER WITH
SELF-DRIVEN BJT SYNCHRONOUS RECTIFIER**

FIG. 6

| | POWER CONSUMPTION (%EFFICIENCY) | INPUT VAC SUPPLY VOLTAGE | MAIN SWITCH BREAKDOWN REQUIREMENTS |
|---|---|---|---|
| PRIOR ART FORWARD CONVERTER OF FIG. 2 | ~87% | CANNOT OPERATE FROM EITHER 110VAC OR 220VAC | MORE DEMANDING |
| FORWARD CONVERTER WITH SELF-DRIVEN BJT SYNCHRONOUS RECTIFIER OF FIG. 6 | ~90% | CAN OPERATE FROM EITHER 110VAC OR 220VAC | LESS DEMANDING |

FIG. 7

PROBLEMS WITH PRIOR ART CONVERTER
(SHALLOW CONTINUOUS CONDUCTION MODE OPERATION)

CROSS-SECTIONAL DIAGRAM OF N-CHANNEL FET

OPERATION OF N-CHANNEL FET $$I_1 = \int (V/L_1)dt$$
$$I_2 = \int (V/L_2)dt$$
INDUCTIVE CURRENT SPLITTING
FIG. 13
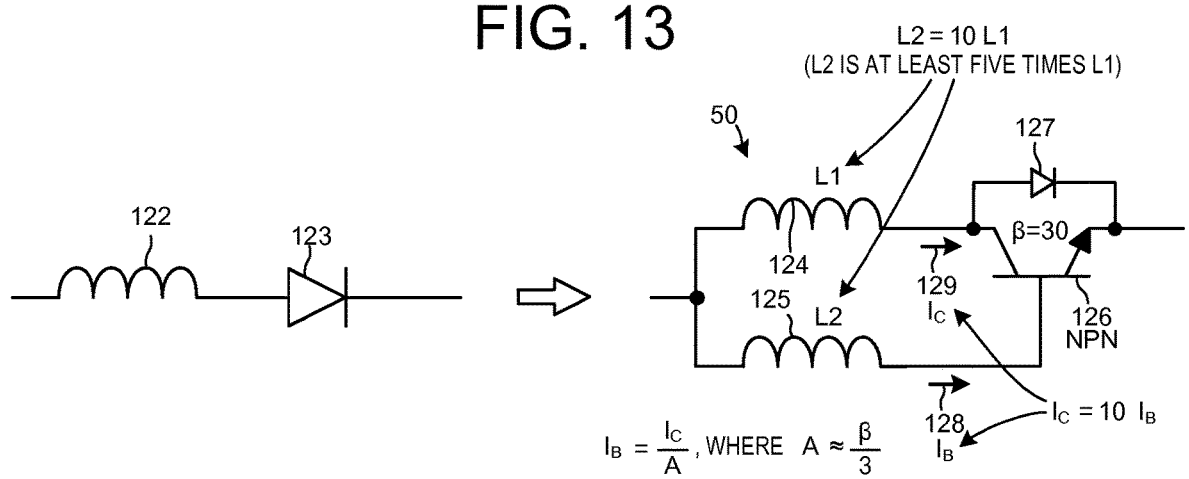
FIG. 14
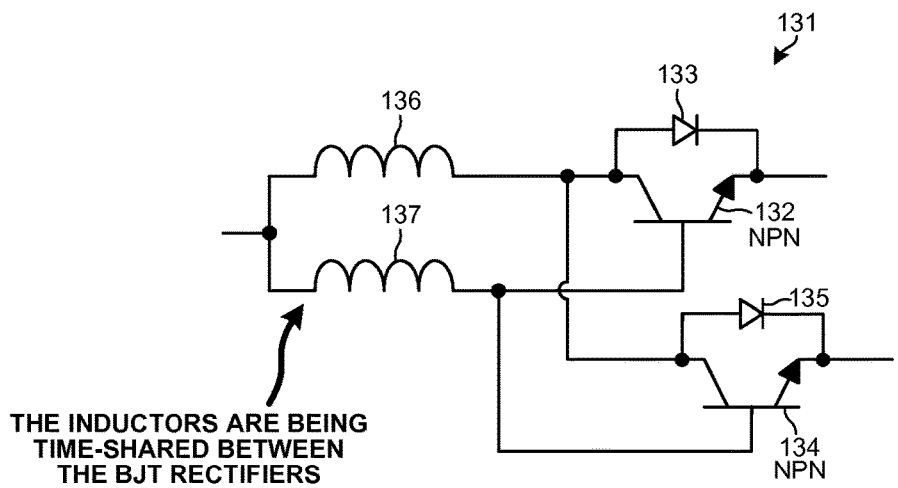
THE INDUCTORS ARE BEING TIME-SHARED BETWEEN THE BJT RECTIFIERS
FIG. 15

INDUCTOR 137 IS PHYSICALLY SMALLER
THAN INDUCTOR 136, BUT HAS TEN TIMES
THE INDUCTANCE

OPERATION OF FORWARD CONVERTER WITH
SELF-DRIVEN BJT SYNCHRONOUS RECTIFIER (SHALLOW CONTINUOUS CONDUCTION MODE OPERATION)

CONVENTIONAL TWO-SWITCH FORWARD CONVERTER

TWO-SWITCH FORWARD CONVERTER WITH
SELF-DRIVEN BJT SYNCHRONOUS RECTIFIER

OPERATION OF TWO-SWITCH FORWARD CONVERTER
WITH SELF-DRIVEN BJT SYNCHRONOUS RECTIFIER

PUSH-PULL CONVERTER

HALF-BRIDGE CONVERTER

FULL-BRIDGE CONVERTER

ZERO VOLTAGE SWITCHING PHASE SHIFT
FULL-BRIDGE CONVERTER

ZERO VOLTAGE SWITCHING PHASE SHIFT FULL-BRIDGE
CONVERTER WITH SELF-DRIVEN BJT SYNCHRONOUS RECTIFIER

OPERATION OF SYMMETRIC SWITCHING
MODE POWER SUPPLY

FORWARD CONVERTER WITH SELF-DRIVEN BJT SYNCHRONOUS RECTIFIER

CROSS REFERENCE TO RELATED APPLICATIONS

This application is a continuation of, and claims priority under 35 U.S.C. § 120 from, nonprovisional U.S. patent application Ser. No. 14/083,055 entitled "Forward Converter with Self-Driven BJT Synchronous Rectifier," filed on Nov. 18, 2013, now U.S. Pat. No. 9,263,959, the subject matter of which is incorporated herein by reference.

TECHNICAL FIELD

The described embodiments relate generally to reducing conduction losses in switching power supply circuits such as, for example, switching power supply circuits that involve forward converters.

BACKGROUND INFORMATION

A forward converter is a DC-to-DC converter that uses a transformer to increase or decrease the output voltage and to provide galvanic isolation for the load. Although its circuit topology is similar to that of the well-known flyback converter, a forward converter operates in a different way. A flyback converter stores energy as a magnetic field in a transformer during the time the main switch is on. When the switch is on, current is flowing through the primary winding of the transformer. When the main switch turns off, the magnetic field decreases and energy is transferred from the transformer to the output of the flyback converter as electric current. In contrast, a forward converter ideally stores no energy in its transformer during the time the main switch is on. Rather, when the main switch of a forward converter is turned on energy passes through the transformer directly to the output of the forward converter by transformer action. Ideally energy flows through transformer but is not stored in the transformer. The main switch is then turned off, but current continues flowing to the output capacitor and load due to an inductance disposed in the output current path. The inductance is disposed between the transformer secondary winding and the output capacitor. As the energy stored in the inductance is removed over time, the inductor current decreases and the rate of energy transfer to the output decreases. In the next switching cycle, when the main switch is turned on the inductor current starts increasing again and the rate of energy transfer to the output increases again. The output voltage across the output capacitor is regulated by controlling the on time of the main switch.

The transformer of the forward converter is not, however, ideal. An ideal transformer has infinite magnetizing inductance but a practical transformer has a limited magnetizing inductance. As a result, in the forward converter, when the main switch is turned off some magnetization energy remains stored in the transformer. If the remaining magnetization energy is not removed from the transformer before the next switching cycle is started, then the magnetization energy remaining in the transformer core will accumulate from cycle to cycle until the core saturates. The transformer will not work properly with a saturated core. A current path is therefore provided to remove trapped energy from the transformer before the main switch is closed again at the beginning of the next switching cycle. A tertiary winding is often provided for this purpose. A diode is coupled between the tertiary winding and the input capacitor. If during demagnetization the voltage across the tertiary winding exceeds the input DC voltage on the input capacitor, then a current flows back from the tertiary winding, through the diode, and back into the input capacitor. This current transfers the magnetization energy from the transformer back into the input capacitor. As the magnetization energy in the core is removed, the current flow through the diode decays. When all the magnetization energy in the core has been removed, the core is said to have been "reset". To ensure that the core is in fact reset and that residual energy does not remain, an amount of "idle" time is generally provided between the time when the core is believed to have been reset and the time when the next switching cycle is initiated. After the idle time has expired, the main switch is turned on again to start the next cycle. One switching cycle therefore involves: 1) a time $T_{on}$ when the main switch is on, 2) a time $T_{demag}$ when the main switch is off and the core is being demagnetized, and 3) and an idle time $T_{idle}$ after core demagnetization while the main switch is still off.

FIG. 1 (Prior Art) is a circuit diagram of an AC-to-DC converter circuit 1 that includes a forward converter. Circuit 1 includes a full-bridge rectifier 2, a power factor correction circuit 3, an input capacitor 4, a main switch 5, a switch driver circuit 6, a transformer 7, a demagnetization path diode D1 8, a rectification diode D2 9, a free-wheeling diode 10, an output inductor L1 11, and an output capacitor 12. The AC-to-DC converter circuit 1 receives a 110 volt RMS AC input supply voltage $V_S$ 13, and supplies a load 14 with a 2.5 volt DC output voltage $V_O$ 15. Transformer 7 includes a primary winding 16 having $N_1$ turns, a secondary winding 17 having $N_2$ turns, and a tertiary winding 18 having $N_3$ turns. The switch driver circuit 6 has a startup power connection (not shown) and a power connection to the output voltage of the secondary side (not shown). Details of the switch driver circuit 6 and output regulation circuitry are not shown.

FIG. 2 (Prior Art) is a simplified diagram that illustrates the relationship of the windings 16, 17 and 18 of the transformer 7. A practical realization of transformer 7 may take on a different form. The diagram of FIG. 2 is presented here for instructional purposes.

FIG. 3 (Prior Art) is a diagram that illustrates the waveform of the sinusoidal input supply voltage $V_S$ 13. The input supply voltage $V_S$ is a 110 volt RMS, 60 Hz signal having a peak voltage of about 156 volts. The DC output voltage $V_O$ 15 in this example is 2.5 volts DC signal. Waveform $V_1$ 19 represents the voltage across the input capacitor 4. Each half period of the incoming sinusoidal voltage $V_S$ 13 has a duration of about 8.3 milliseconds. The main switch 5, however, has a switching cycle of 10 microseconds. There are many switching cycles of the main switch in each 8.3 millisecond half period of the incoming AC supply voltage.

In a switching cycle, when the main switch is turned on, the rough DC voltage $V_1$ is applied to the primary winding and simultaneously a scaled voltage appears across the transformer secondary winding. The input voltage $V_1$ to output voltage $V_O$ ratio is set by the primary-to-secondary turns ratio of the transformer. Diode D2 is forward biased. A charging current 20 flows through inductor L1 and charges the output capacitor 12. This current 20 increases over time while the main switch is closed. When the main switch is then turned off, the primary winding current and the secondary winding current both fall to zero. Current 20 through the inductor L1, however, continues flowing. Current 20 does not flow through rectifier diode D2, however, but rather flows from ground node 21, up through free-wheeling diode D3, through the inductor L1, and to output node 22 and the output capacitor 12 and load 14. The required emf to maintain this current 20 flowing when main switch is off comes from the inductor L1. Current 20 decreases over time when the switch is off. Despite the increasing and decreasing inductor current as the main switch turns on and off, the large output capacitor 12 maintains a relatively constant DC output voltage $V_O$ 15 across the load 14. The switching cycle then repeats.

The rectification diodes D2 and D3 suffer conduction losses. The forward conduction loss of a diode is equal to the product of the forward voltage drop across the diode and the forward conduction current. Such forward conduction losses contribute to the overall power loss of the forward converter circuit. By replacing each of the rectifier diodes D2 and D3 with a field effect transistor that operates as a synchronous rectifier, the equivalent forward voltage drops across the rectifiers can be lowered. Due to the lowered forward voltage drop, the conduction loss of the rectifier is reduced and efficiency of the overall forward converter circuit is increased.

FIG. 4 (Prior Art) is a diagram of a common forward converter circuit 23. The circuit 23 of FIG. 4 is similar to the circuit of FIG. 1, except that the diodes D2 and D3 of the simple circuit of FIG. 1 are replaced with field effect transistors 24 and 25, respectively. As shown, in field effect transistor has an inherent body diode. Body diode 26 is the body diode of transistor 24. Body diode 27 is the body diode of transistor 25. The field effect transistors 24 and 25 that are controlled to take the place of the rectifying diodes D2 and D3 in the circuit of FIG. 1, are referred to as synchronous rectifiers. At times when the diodes D2 and D3 in the circuit of FIG. 1 would be on and conducting, the field effect transistors 24 and 25 of the circuit of FIG. 4 must be supplied with appropriate gate signals so that these transistors are on. At other times, the gates of the transistors 24 and 25 should be driven so that the transistors are off. In the conventional circuit of FIG. 4, the voltage across the secondary winding 17 is used to drive the gates of the synchronous rectifiers Q1 and Q2 so that the transistors are on and conductive at the appropriate times, and are off and nonconductive at the appropriate times. Because there is no extra active drive circuit involved in driving the gates of the field effect transistors, the field effect transistors are said to be "self-driven". The forward converter circuit is said to be a forward converter with self-driven synchronous rectifiers.

FIG. 5 (Prior Art) is a waveform diagram that illustrates signals and voltages in the forward converter circuit of FIG. 4. The upper waveform labeled $V_{GS,Q1}$ is the gate drive signal that is supplied onto the gate of the main switch Q1 5. The second waveform labeled $V_{DS,Q1}$ represents the drain-to-source voltage across the main switch Q1 5. The third waveform labeled $V_R$ represents the voltage $V_R$ 28 indicated in FIG. 4. The next waveform labeled $V_{GS}$ represents the gate-to-source voltages supplied onto the gates of transistors Q2 24 and Q3 25, respectively. The next waveform labeled $I_{L1}$ represents the current 20 flowing through the inductor L1 in the circuit of FIG. 4. The bottom waveform labeled $V_O$ represents the DC output voltage $V_O$ 15.

Unfortunately, as is known in the art, synchronous rectifiers also have conduction losses. There are several different reasons for the conduction losses. Many techniques and circuits are known in the art for reducing conduction losses in synchronous rectifiers. These techniques are sometimes classified to fall into one of three classes: a self-driven synchronous rectifier class, a hybrid self-driven synchronous rectifier class, and a control-driven synchronous rectifier class. The control-driven synchronous rectifier class of circuits, for example, includes so-called predictive gate drive circuits and so-called adaptive gate drive circuits. Despite the existence of many circuits and techniques for reducing conduction losses in the synchronous rectifiers of forward converters, each circuit or technique suffers from one or more drawbacks such as expense, complexity, relative ineffectiveness, and possible catastrophic failure modes.

SUMMARY

In a first novel aspect, an AC-to-DC converter circuit includes a forward converter circuit. The main switch of the forward converter is switched at a relatively high frequency such as, for example, ten kilohertz or more. The secondary side of the forward converter circuit includes a secondary winding of a transformer. The secondary winding has a first end and a second end. The secondary side of the forward converter circuit further includes an output capacitor having a first terminal and a second terminal. The first terminal of the output capacitor is coupled to the first end of the secondary winding. The secondary side of the forward converter circuit further includes a first bipolar transistor and a second bipolar transistor. The emitter of the first bipolar transistor is coupled to the first end of the secondary winding. The emitter of the second bipolar transistor is coupled to the second end of the secondary winding. The bases of first and second bipolar transistors are coupled together. The collectors of the first and second bipolar transistors are coupled together. A first diode is coupled between the collector and emitter of the first bipolar transistor so that the anode is coupled to the collector and so that the cathode is coupled to the emitter. A second diode is coupled between the collector and emitter of the second bipolar transistor so that the anode is coupled to the collector and so that the cathode is coupled to the emitter. The secondary side of the forward converter further includes a first inductor and a second inductor that are not magnetically coupled. The first inductor is coupled between the second terminal of the output capacitor and the collectors of the first and second bipolar transistors. The second inductor is coupled between the second terminal of the output capacitor and the bases of the first and second bipolar transistors.

The first bipolar transistor and the first diode function as a first self-driven synchronous rectifier whereas the second bipolar transistor and the second diode function as a second self-driven synchronous rectifier. The first and second inductors function as an inductive current splitting circuit that supplies a base current to turn on the first and second self-driven synchronous rectifiers at the appropriate times. During a time in a switching cycle when one or the other of the synchronous rectifiers is to be conductive, the current splitting inductors provide a current onto a base node. The bases of both bipolar transistors of the first and second synchronous rectifiers are coupled to this base node. The current flows from the base node through the base of the bipolar transistor of whichever one of the two synchronous rectifiers is to be turned on. If neither of the two synchronous rectifiers is to be turned on, then the current splitting inductors do not supply the current onto the base node and the bipolar transistor of neither of the two synchronous rectifiers is turned on.

Advantageously, as compared to using conventional self-driven synchronous rectifiers based on field effect transistors in the secondary side of the forward converter circuit, using the novel bipolar-transistor based synchronous rectifiers in the secondary side of the forward converter circuit results in lower power consumption. In addition, as compared to the main switch of a forward converter using conventional self-driven synchronous rectifiers, the main switch of the novel AC-to-DC converter circuit can have a lower reverse breakdown capability, and as a consequence a main switch having a lower $R_{DS(ON)}$ can be employed thereby improving converter efficiency. In addition, the very same AC-to-DC forward converter circuit can be powered from either an incoming 110 volt AC supply or an incoming 220 volt AC supply without changing any circuit components of the forward converter circuit.

In a second novel aspect, the secondary side circuit involving the two self-driven bipolar transistor synchronous rectifiers and the pair of current-splitting inductors is the secondary side circuit of a two-switch forward converter. The use of inductive current splitting to drive bipolar transistors in self-driven synchronous rectifiers is not, however, limited to use in AC-to-DC converter circuits involving forward converters. For example, the use of inductive current splitting to drive bipolar transistors in self-driven synchronous rectifiers is also applicable to AC-to-DC converter circuits involving push-pull converters, half-bridge converters, full-bridge converters, and phase shift full bridge converters.

In a third novel aspect, the secondary side circuit of a switching mode power supply includes a center-tapped secondary winding, a first synchronous rectifier involving a first bipolar transistor and a first diode, a second synchronous rectifier involving a second bipolar transistor and a second diode, a pair of current splitting inductors, and an output capacitor. A first terminal of the output capacitor is coupled to the centertap of the transformer. The emitter of the first bipolar transistor and the cathode of the first diode are coupled together and to a first end of the secondary winding. The emitter of the second bipolar transistor and the cathode of the second diode are coupled together and to a second end of the secondary winding. The anodes of the two diodes and the collectors of the two bipolar transistors are coupled together at a first node. The bases of the two bipolar transistors are coupled together at a second node. A first inductor of the pair of current splitting inductors is coupled between a second terminal of the output capacitor and the first node. A second inductor of the pair of current splitting inductors is coupled between the second terminal of the output capacitor and the second node. The secondary side circuit of the third novel aspect is usable in numerous converter circuits, such as in push-pull converters, half-bridge converters, full-bridge converters, and phase shift full bridge converters.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a diagram of an AC-to-DC converter circuit in accordance with one novel aspect.

FIG. 7 is a table that sets forth relative performance parameters of the prior art AC-to-DC converter circuit of FIG. 2 as compared to the novel AC-to-DC converter circuit of FIG. 6.

FIG. 13 shows how a pair of parallel-connected inductors can split a current flowing between two nodes into two currents $I_1$ and $I_2$.

FIG. 14 is a diagram showing a rough equivalence between a first circuit involving inductor coupled in series with a diode and a second circuit involving two current-splitting inductors, a bipolar transistor, and a diode.

FIG. 15 is a diagram of a circuit 131 that is a rough equivalent of, and can therefore replace, the circuit 130 of FIG. 12.

DETAILED DESCRIPTION

Figure 1:
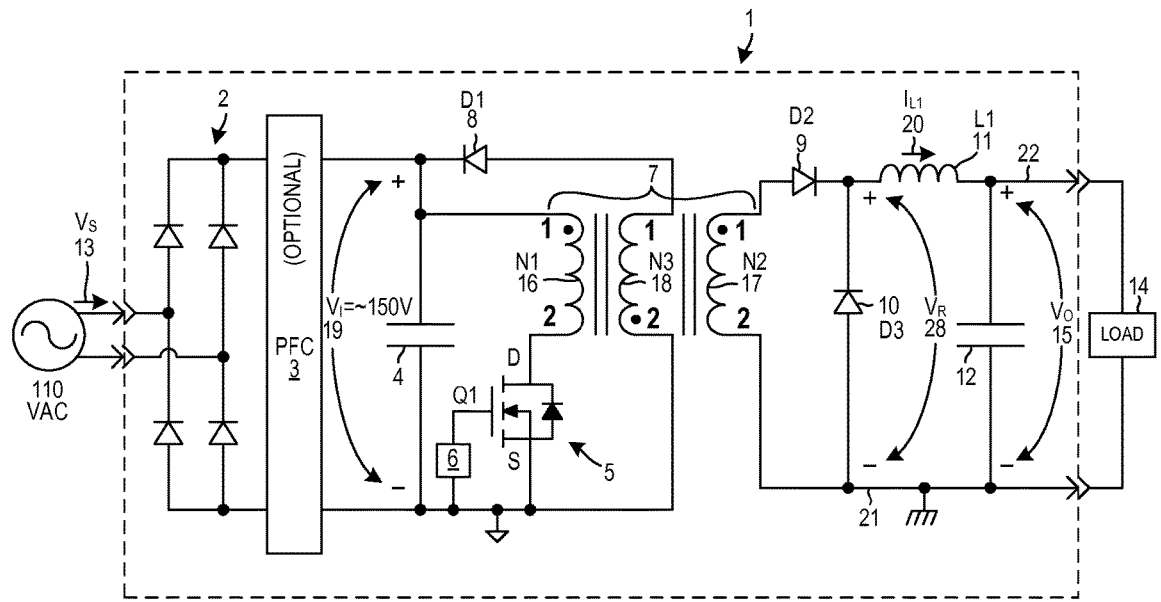
FIG. 1 (Prior Art) is a circuit diagram of an AC-to-DC converter circuit that includes a forward converter.

Reference will now be made in detail to some embodiments of the invention, examples of which are illustrated in the accompanying drawings.

FIG. 6 is a diagram of an AC-to-DC converter circuit 50 in accordance with one novel aspect. The AC-to-DC circuit 50 includes a full-bridge rectifier 52, a power factor correction circuit 53, an input capacitor 54, a main switch 55, a switch driver circuit 56, a transformer 57, a demagnetization path diode D1 58, a first bipolar transistor Q2 59, a first diode D2 60, a second bipolar transistor Q3 61, a second diode D3 62, a first inductor L1 63, a second inductor L2 64, and an output capacitor 65. Reference numeral 66 identifies an output voltage node of the secondary side of the AC-to-DC circuit 50. Reference numeral 67 identifies a ground node of the secondary side of the AC-to-DC circuit 50. Reference number 85 identifies a base node. The AC-to-DC converter circuit 50 receives a 110 volt RMS AC input supply voltage $V_S$ 68, and supplies a load 69 with a 2.5 volt DC output voltage $V_O$ 70. Transformer 57 includes a primary winding 71 having $N_1$ turns, a secondary winding 72 having $N_2$ turns, and a tertiary winding 73 having $N_3$ turns. The switch driver circuit 56 has a startup power connection (not shown) and a power connection to the output voltage of the secondary side (not shown). Details of the switch driver circuit 56 and output regulation circuitry are not shown. The main switch 55 is controlled by the switch drive circuit 56 to turn on and to turn off at a frequency of approximately ten kilohertz or more.

The AC-to-DC circuit 50 includes a DC-to-DC forward converter circuit. The DC-to-DC forward converter circuit includes all the components of the AC-to-DC converter circuit 50 but for the full-bridge rectifier 52 and the optional power factor correction circuit 53.

In the present example, bipolar transistor Q2 59 and diode D2 60 are provided on the same semiconductor die 74. Bipolar transistor Q3 61 and diode D3 62 are provided on the same semiconductor die 75. The emitter of bipolar transistor 59 is on the substrate side of die 74 and the emitter of bipolar transistor 61 is on the substrate side of die 75. As the AC-to-DC circuit 50 operates, there will be different voltages on the emitters of the two bipolar transistors. The bipolar transistors are therefore provided as two different dice in the illustrated example. Unlike the case of a field effect transistor where a body diode is inherently present, a diode is not inherently present in a bipolar transistor die structure. Each of dice 74 and 75 is a special RBJT (Reverse Bipolar Junction Transistor) integrated circuit die that incorporates both a bipolar transistor as well as a parallel-coupled distributed diode. The RBJT and distributed diode integrated circuit die has emitter-to-collector and emitter-to-base reverse breakdown withstand voltages that exceed twenty volts. For additional information on a suitable RBJT and distributed diode integrated circuit die that is usable in a forward converter with a self-driven BJT synchronous rectifier, see: U.S. patent application Ser. No. 13/299,340, entitled "Bipolar Junction Transistor For Current Driven Synchronous Rectifier", filed Nov. 17, 2011, by Kyoung Wook Seok (the entire subject matter of which is incorporated herein by reference).

As compared to a field effect transistor that is a voltage driven device, a bipolar transistor is current driven device in that a base current is driven into or out of the base to make a collector-to-emitter current flow through the transistor. To turn off the transistor, the base current is stopped. To turn on an NPN bipolar transistor of a synchronous rectifier in the circuit of FIG. 6, a relatively large base current is driven into the base in order to cause the transistor to saturate and to conduct a current between its collector and emitter terminals with a relatively low $V_{CE}$. The base currents for controlling the bipolar transistors 59 and 61 are supplied via base node 85 by inductor L2 64. The magnitude of the combined base currents (supplied by inductor L2 as current $I_{L2}$) is set to be a proportion of the inductor current $I_{L1}$ flowing through inductor L1 63, where this proportion is determined by the fixed ratio of the inductance of inductor L1 63 to the inductance of inductor L2 64. The forward converter of the AC-to-DC circuit 50 of FIG. 6 is therefore said to have self-driven BJT (Bipolar Junction Transistor) synchronous rectifiers.

Figure 4:
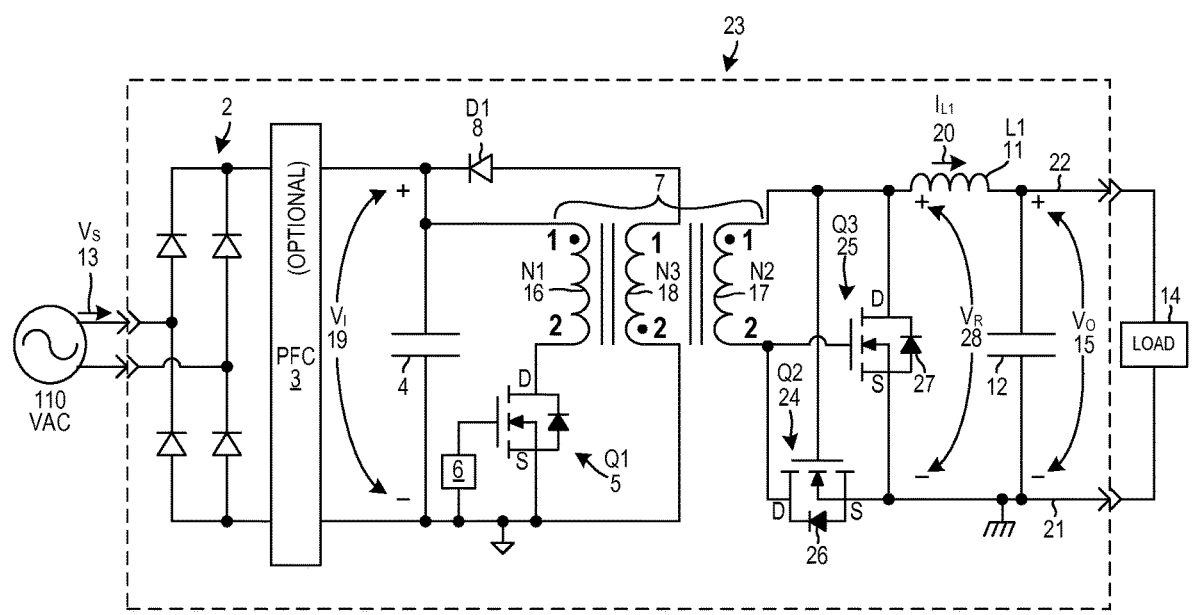
FIG. 4 (Prior Art) is a circuit diagram of an AC-to-DC converter circuit that includes a forward converter circuit.

FIG. 7 is a table that sets forth relative performance parameters of the prior art AC-to-DC converter circuit 23 of FIG. 4 as compared to the novel AC-to-DC converter circuit 50 of FIG. 6. The novel AC-to-DC converter circuit 50 is approximately three percent more efficient as compared to the prior art AC-to-DC converter circuit 23 of FIG. 4. This three percent improvement assumes an L1 peak current of 80 A and a valley of 10 A in the prior art AC-to-DC converter circuit 23. The average inductor current is therefore about 80 A plus 10 A divided by two, or 45 A. The output power, assuming an output voltage $V_O$ of 2.5 volts DC and an average output current of 45 A, is 135 W. If the input power is 156 W, then the efficiency of the prior art AC-to-DC converter circuit 23 is about 87 percent. In prior art circuit of FIG. 2, the Q3 transistor stops working as a switch at about 40 A, as explained in further detail below. The body diode of the Q3 transistor conducts the free-wheeling current from 40 A down to about 10 A. So during the time of the diode free-wheeling operation, which is approximately 30 percent of the switching period, the average current is 25 A. The average current of 25 A is estimated as the average of 40 A and 10 A. The power loss is therefore about 7.5 W, assuming a 1.0 volt voltage drop across the body diode of the free-wheeling field effect transistor. Power loss across the free-wheeling field effect transistor is therefore 7.5 W/135 W, or 5.6 percent. By employing the bipolar transistors, the distributed diodes, and the current-splitting inductors of the novel AC-to-DC converter circuit of FIG. 6, the 7.5 W power loss across the body diodes of the conventional circuit can be reduced to about 1.5 W, which is a 6 W reduction. The input power received into the novel AC-to-DC converter circuit is about 150 W. The efficiency of the novel AC-to-DC converter circuit 50 of FIG. 6 is therefore roughly 135 W/150 W, or 90 percent.

Figure 8:
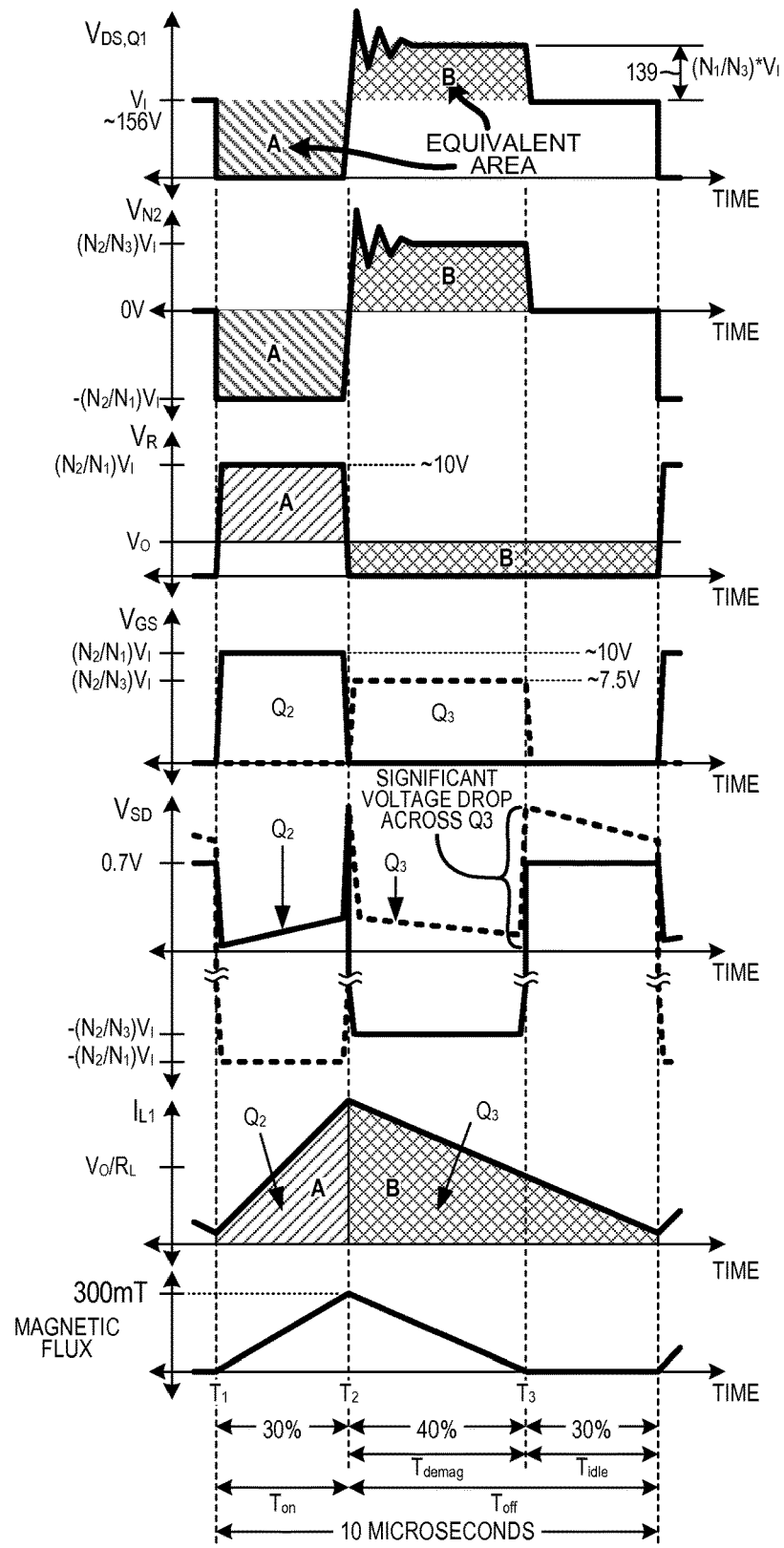
FIG. 8 is a waveform diagram that illustrates the operation of the prior art AC-to-DC converter circuit of FIG. 4 in more detail.

Explanation of how and why the novel AC-to-DC forward converter circuit 50 of FIG. 6 is structured and operates is described in relation to the waveform diagram of FIG. 8. FIG. 8 is a waveform diagram that illustrates the operation of the prior art AC-to-DC forward converter circuit 23 of FIG. 4 in more detail. In the waveform labeled $I_{L1}$ of FIG. 8, notice that there is current flowing through inductor L1 during time $T_{idle}$. In the waveform labeled $V_{Gs}$ of FIG. 8, notice that the gate-to-source voltage of field effect transistor Q3 25 of FIG. 4 drops to about zero volts roughly at the beginning of time $T_{idle}$. The low gate-to-source voltage on field effect transistor Q3 means that the field effect transistor Q3 is substantially turned off. For field effect transistor Q3 to be turned on and to have a reasonably low $R_{DS(ON)}$, transistor Q3 should have a gate voltage $V_{Gs}$ substantially greater than zero volts, yet the $V_{Gs}$ of transistor Q3 during the $T_{idle}$ period of time is about zero volts. Conduction of the inductor current $I_{L1}$ of the $I_{L1}$ waveform that flows from node 22 of the circuit of FIG. 4 to node 21 of the circuit of FIG. 4 therefore flows largely through the body diode 27 of the field effect transistor Q3 25.

Figure 9:
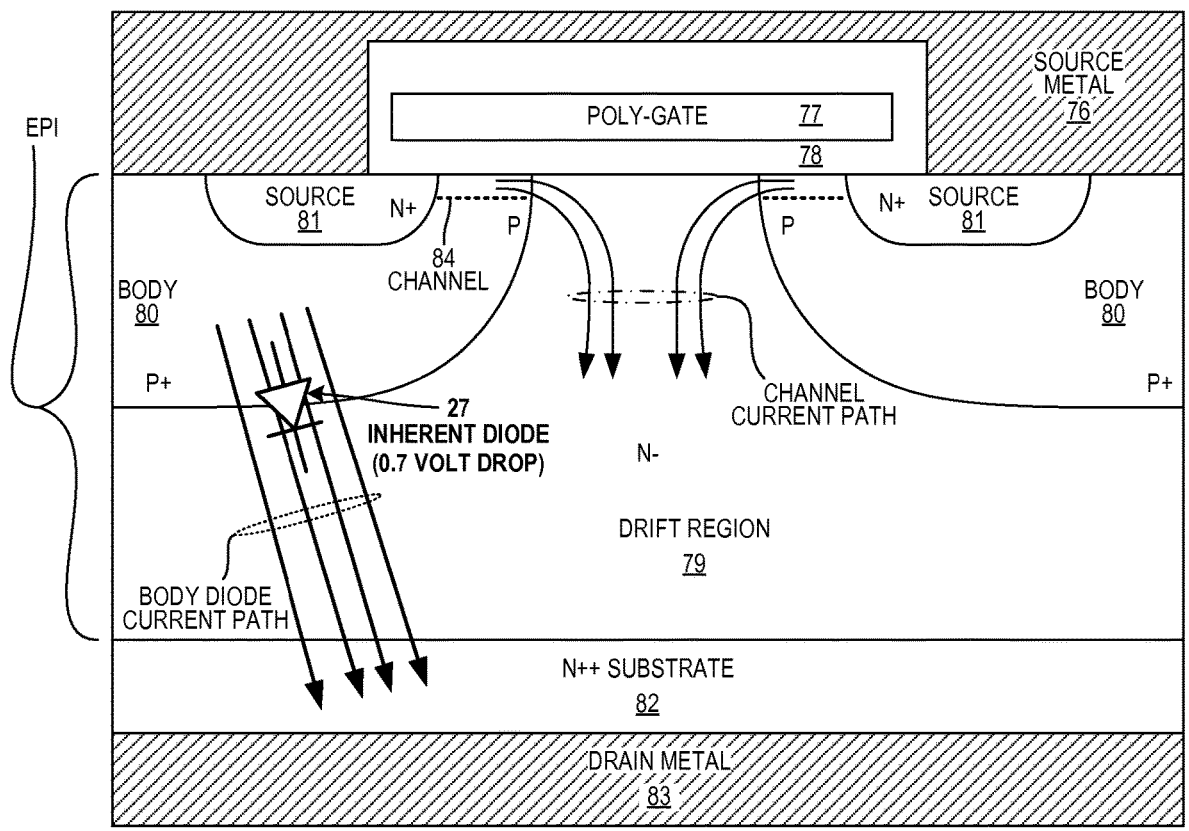
FIG. 9 is a simplified cross-sectional diagram of a field effect transistor and a diode of the AC-to-DC converter circuit 23 of FIG. 4.

FIG. 9 is a simplified cross-sectional diagram of the field effect transistor Q3 25 and inherent body diode 27 of the prior art AC-to-DC converter circuit 23 of FIG. 4. The structure in includes a metal source electrode 76, a polysilicon gate 77, a gate insulator layer 78, an N− type drift region 79, a P+ type body region 80, an N+ type source region 81, an N++ type substrate layer 82, and a metal drain electrode 83. Regions 79, 80 and 81 are regions of an epitaxial semiconductor layer disposed on the N++ type substrate 82. The inherent body diode 27 is the PN junction between the P+ body region 80 and the N− type drift region 79. The diode symbol identified by reference numeral 27 schematically depicts this body diode junction. If the field effect transistor Q3 is turned on, then a conductive channel 84 is formed and current can flow from the source region 81, laterally through the channel 84, into the drift region 79, and then vertically down through the drift region 79, through the N++ type substrate layer 82, and to the drain metal electrode 83. The $V_{SD}$ voltage drop may, for example, be approximate 0.2 volts depending on the magnitude of the current flow and the magnitude of the gate voltage on the transistor structure. If the field effect transistor Q3 is turned off then current can still flow from the source metal electrode 76 to the drain metal electrode 83, but the voltage drop of the current path will be larger. Current can flow from the source metal electrode 76, through the P+ type body region 80, across the junction of body diode 27, into the N− type drift region 79, down through the N++ type substrate layer 82, and to the drain metal electrode 83. The voltage drop across the forward biased inherent body diode 27 is, however, approximately one volt. Because power loss is equal to the product of the current flow and the voltage drop, flowing the current through the larger voltage drop of the body diode 27 is seen to consume more power than flowing the current through the smaller voltage drop across the channel if the transistor is on.

Figure 10:
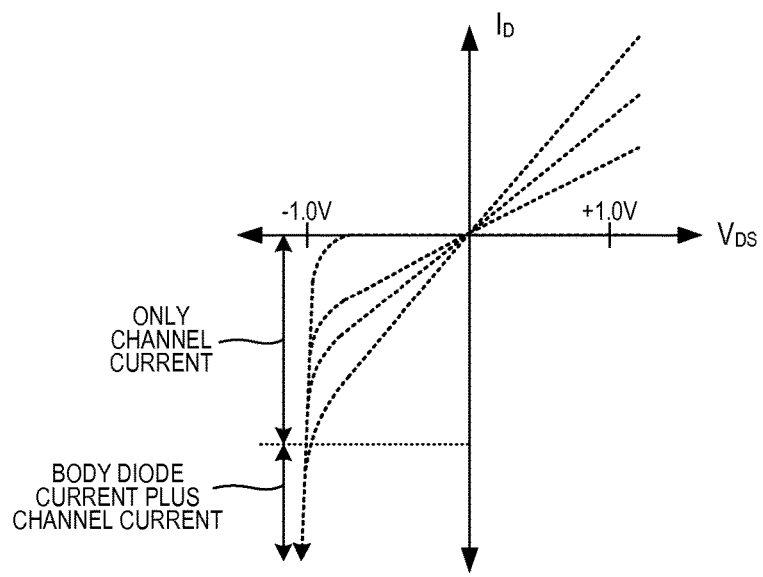
FIG. 10 is a diagram that illustrates the drain current $I_D$ to drain-to-source voltage $V_{DS}$ of the field effect transistor structure of FIG. 9.

FIG. 10 is a diagram that illustrates the drain current $I_D$ to drain-to-source voltage $V_{DS}$ of the field effect transistor structure of FIG. 9.

As illustrated in the waveform labeled $V_{SD}$ in FIG. 8, there is a large source-to-drain voltage $V_{SD}$ across the transistor Q3 during the $T_{idle}$ time due to current flow through the inherent body diode 27 of the field effect transistor structure. Current flow across this $V_{SD}$ voltage drop gives rise to a substantial power loss Eliminating or reducing some or all of this power loss is a desired objective.

Figure 11:
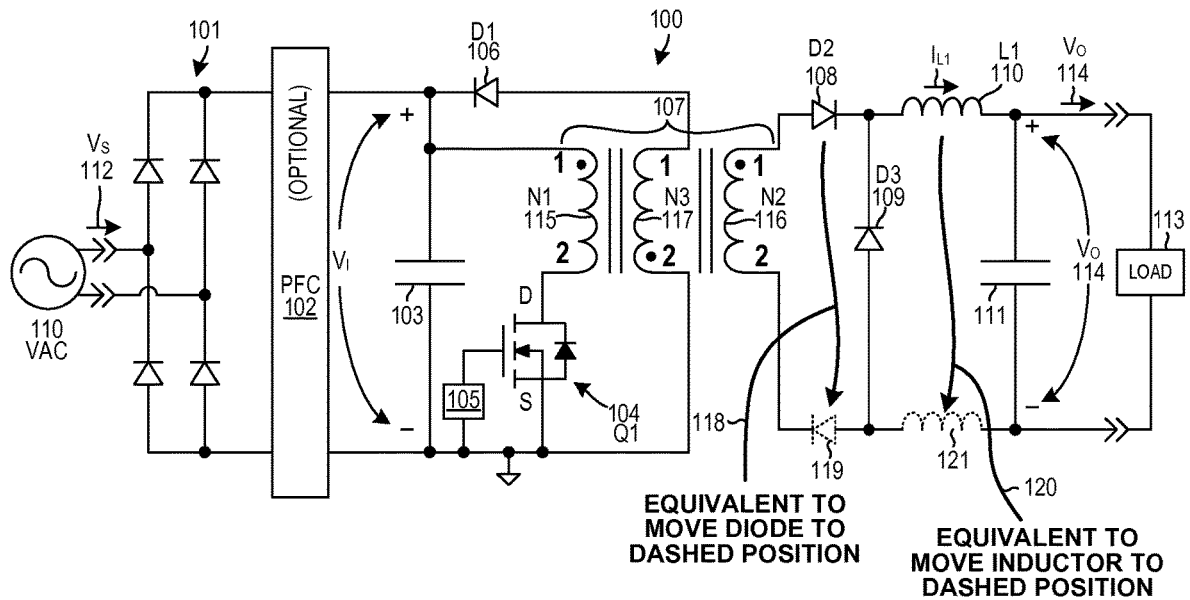
FIG. 11 shows a conventional AC-to-DC converter circuit that includes a forward converter, and also shows how the conventional circuit can be modified without changing its operation.

FIG. 11 shows a well-known AC-to-DC converter circuit 100 that includes a forward converter. The AC-to-DC converter circuit 100 includes a full-bridge rectifier 101, a power factor correction circuit 102, an input capacitor 103, a main switch Q1 104, a gate drive circuit 105, a demagnetization current path diode D1 106, a transformer 107, a rectifier diode D2 108, a free-wheeling diode D3 109, an inductor 110, and an output capacitor 111. The AC-to-DC converter circuit 100 receives a 110 volt RMS AC input supply voltage $V_S$ 112, and supplies a load 113 with a 2.5 volt DC output voltage $V_O$ 114. Transformer 107 includes a primary winding 115 having $N_1$ turns, a secondary winding 116 having $N_2$ turns, and a tertiary winding 117 having $N_3$ turns.

Figure 12:
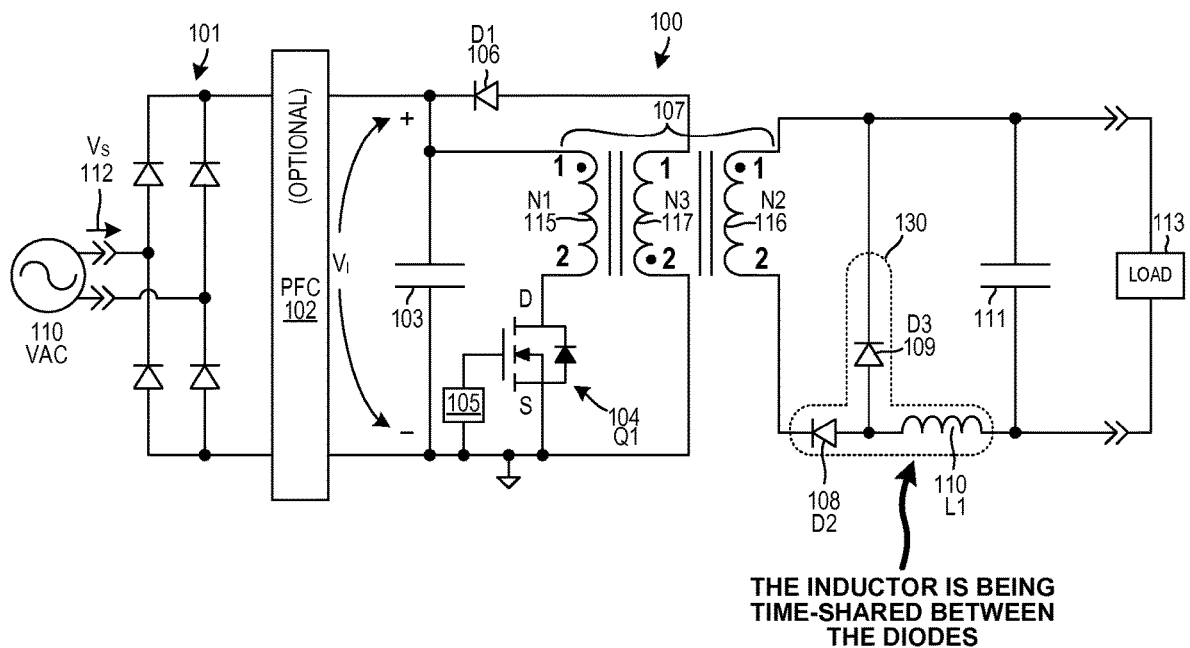
FIG. 12 is a circuit diagram that shows the resulting circuit after the diode D2 and the inductor L1 have been moved as indicated by arrows in FIG. 11.

First, it is recognized by the inventor that the location of diode 108 can be moved as indicated by the arrow 118 labeled "EQUIVALENT" to the location 119 indicated by the diode symbol shown in dashed lines. Also, it is recognized by the inventor that the location of the inductor L1 110 can be moved as indicated by the arrow 120 labeled "EQUIVALENT" to the location 121 indicated by the inductor symbol shown in dashed lines. FIG. 12 is a circuit diagram that shows the resulting circuit 100 after the diode D2 and the inductor L1 have been moved as indicated by arrows in FIG. 11.

FIG. 13 shows how a pair of parallel-connected inductors can split a current flowing between two nodes 88 and 89 into two currents $I_1$ and $I_2$. The relative magnitudes of the two currents $I_1$ and $I_2$ are determined by the relative inductances of the two parallel-connected inductors. The inventor has also recognized that an inductor 122 and a diode 123 connected in series as shown on the left side of FIG. 14 has a rough equivalence with the circuit shown to the right in FIG. 14 involving the two inductors 124 and 125, the bipolar transistor 126, and the diode 127. If a collector-to-emitter forward current is to flow through the bipolar transistor 126, then an adequate base current is be supplied into the base of the bipolar transistor 126 to saturate the transistor. Because the voltage between the collector and the base of a conductive bipolar transistor is small, the voltages across the two inductors 124 and 125 are roughly equal. Because the voltages across the inductors 124 and 125 are roughly equal, the current-splitting relationship illustrated in FIG. 13 can be used to set the inductances of the two inductors 124 and 125 so that the magnitude of the injected base current 128 is a desired fraction (for example, one tenth) of the collector current 129 flowing into the collector of the bipolar transistor. In this example, the inductance of the second inductor 125 is at least five times greater (it may be, for example, ten times greater) than the inductance of the first inductor 124. The base current, when a synchronous rectifier is to be conducting current, needs to be adequately large to fully saturate the bipolar transistor of the synchronous rectifier.

It is desired to use the equivalence set forth in FIG. 14 to replace the components in FIG. 12 that are circled by the dashed line 130. It is recognized that current only flows through one of the diodes 108 and 109 at a time. The inductor 110 can therefore be thought of as being time-shared between the two diodes. Accordingly, the circuit circled by the dashed line 130 in FIG. 12 can be replaced by the circuit 131 shown in FIG. 15. In the circuit 131 of FIG. 15, each diode is replaced by a bipolar transistor and a diode. Diode 108 is replaced by bipolar transistor 132 and diode 133. Diode 109 is replaced by bipolar transistor 134 and diode 135. The parallel inductors 136 and 137 of the substitution are, however, shared between the diode replacement circuits because as mentioned above only one of the two diode replacement circuits will conduct current at a given time.

Figure 16:
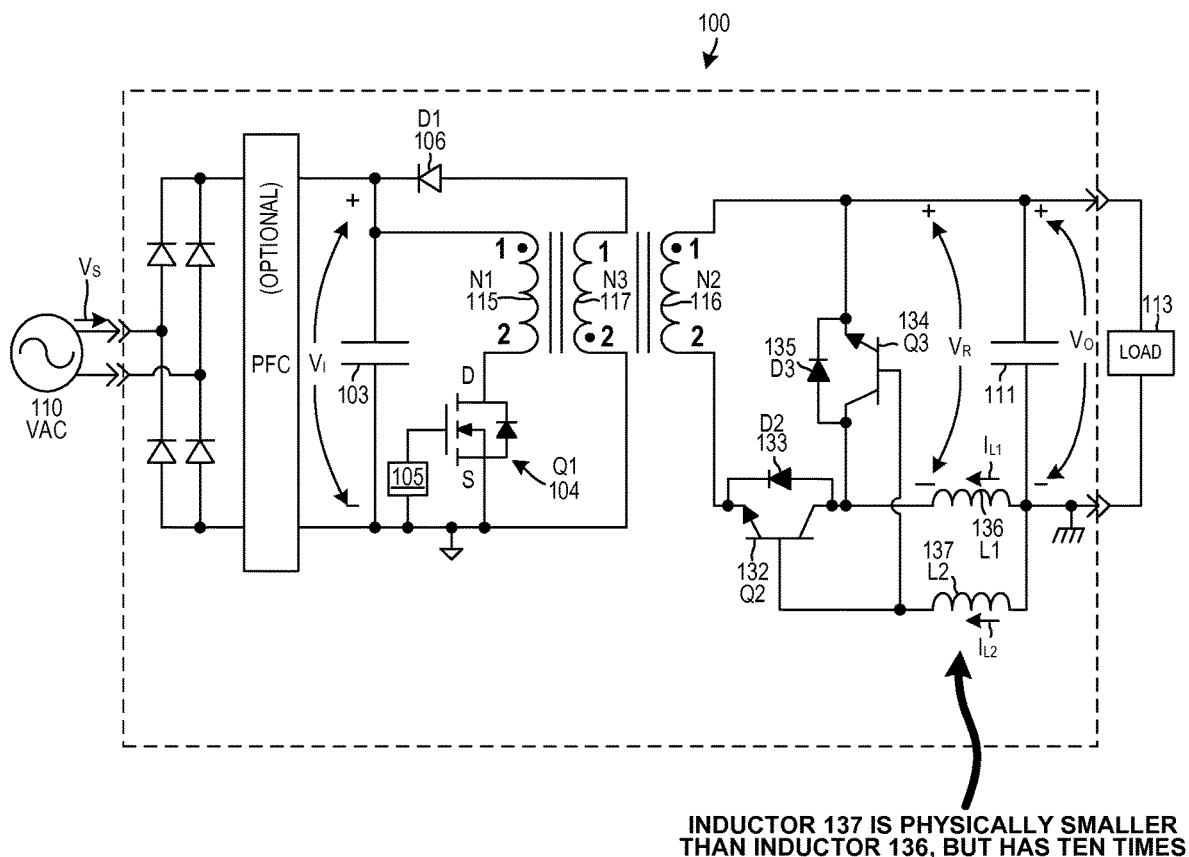
FIG. 16 is a diagram showing the AC-to-DC converter circuit of FIG. 12 with the circuitry enclosed by the dashed line 130 having been replaced by the circuitry 131 of FIG. 15.

FIG. 16 is a diagram showing the AC-to-DC converter circuit of FIG. 12 after the circuitry in the dashed line 130 has been replaced by the circuitry 131 of FIG. 15. The resulting AC-to-DC converter circuit 100 of FIG. 16 is the same AC-to-DC converter circuit 50 as shown in FIG. 6, only in FIG. 16 different reference numerals are used to denote the various components due to the explained derivation of the circuit from the prior art circuit of FIG. 11 as explained above in connection with FIGS. 11-16.

Figure 17:
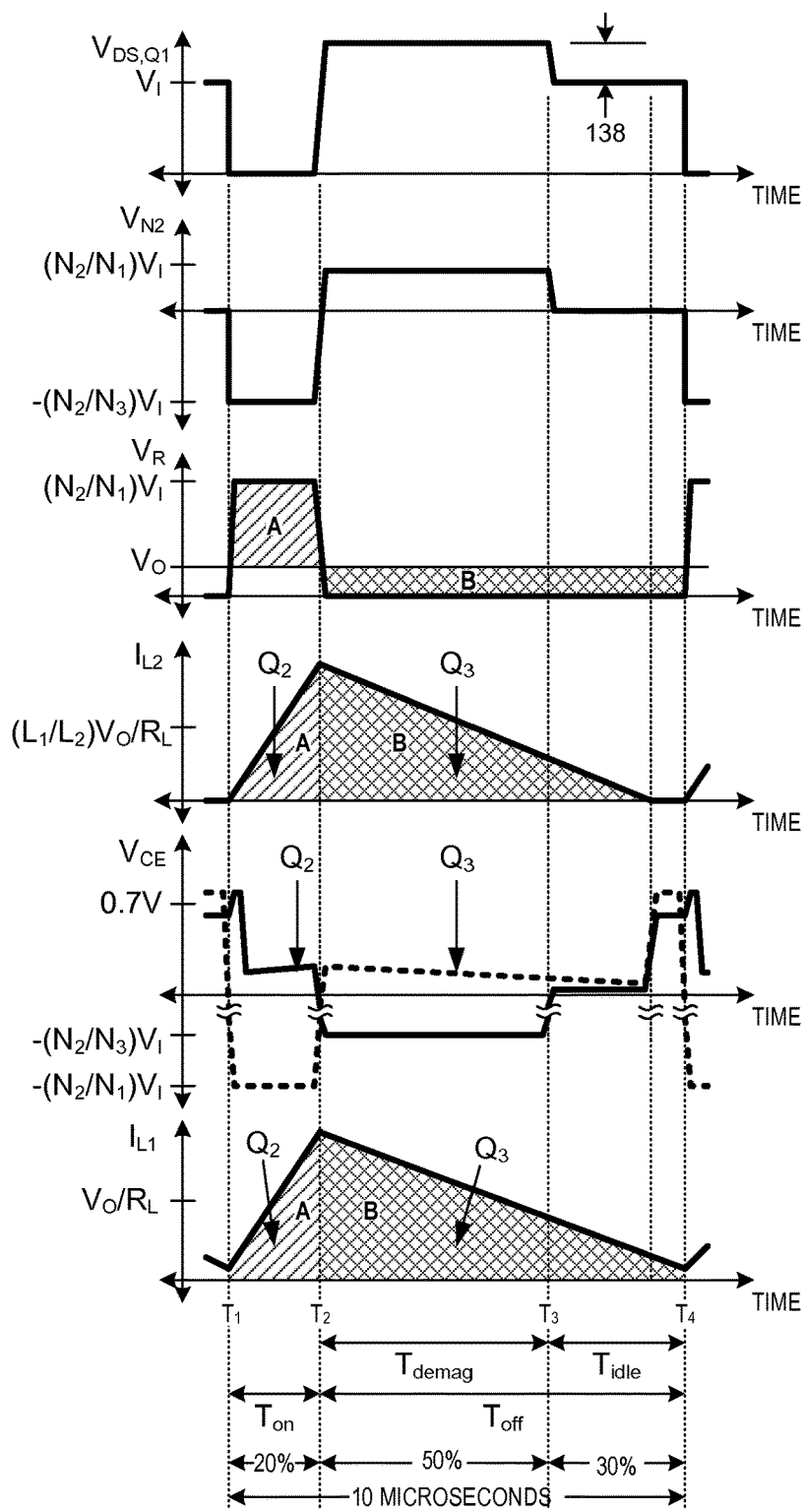
FIG. 17 is a waveform diagram that illustrates operation of the novel AC-to-DC converter circuit of FIG. 6.

FIG. 17 is a waveform diagram that illustrates operation of the novel AC-to-DC converter circuit 50 of FIG. 6. As compared to the prior art operation shown in the waveforms of FIG. 8 where the field effect transistor Q3 in the conventional circuit is off during $T_{idle}$, the bipolar transistor 61 in the novel circuit of FIG. 6 is not off during $T_{idle}$. As indicated in the waveform labeled $I_{L1}$ in FIG. 17, there is a substantial inductor current flowing through inductor L1 during $T_{idle}$. This current flows through the free-wheeling synchronous rectifier involving bipolar transistor 61 and diode 62. Due to the current splitting function of inductors 63 and 64, a fixed percentage of the current $I_{L1}$ is injected into the base of bipolar transistor Q3 61, thereby keeping bipolar transistor fully turned on and saturated throughout the majority of $T_{idle}$.

Toward the end of $T_{idle}$, when the current $I_{L1}$ stops at time $T_4$, then the base current into bipolar transistor Q3 61 is so small that the distributed diode 62 conducts. The voltage drop across a forward biased diode 62 is typically a voltage larger than 0.7 volts. Power consumption is therefore larger after time $T_4$ as a result of diode conduction. The waveform labeled $V_{CE}$ in FIG. 17 shows the $V_{CE}$ voltages across bipolar transistor Q2 59 and across bipolar transistor Q3 61. Despite the larger $V_{CE}$ toward the end of $T_{idle}$, the duration of this higher power consumption at the end of $T_{idle}$ is relatively short. The loss power is therefore also relatively small.

Likewise, at the very beginning of the switching cycle at time $T_1$ the inductor current is small and has not yet increased to the point that the base current flowing into the bipolar transistor Q2 59 is sufficient to turn the bipolar transistor on. The $V_{CE}$ drop across the bipolar transistor Q2 is shown in the waveform labeled $V_{CE}$ in FIG. 17. Despite the larger $V_{CE}$ voltage drop across bipolar transistor Q2 shortly after time $T_1$, the duration of this higher power consumption is relatively short. The loss of power is therefore correspondingly small.

After the short period of a higher $V_{CE}$ following time $T_1$, the $V_{CE}$ of bipolar transistor Q2 49 decreases from the higher $V_{CE}$ voltage that is slightly greater than 0.7 volts down to a lower forward voltage of about 0.2 volts. Then starting at time $T_2$ and extending until just before the end of the switching cycle at time $T_4$, the $V_{CE}$ of the bipolar transistor Q3 61 remains low at about 0.1 volts. Accordingly, as shown in the waveform labeled $V_{CE}$, for most of the time that a synchronous rectifier (either Q2/D2 or Q3/D3) is to be on and conductive the voltage drops across the synchronous rectifiers is well below 0.7 volts. This low forward voltage drop across the synchronous rectifiers is favorable as compared to the higher $V_{SD}$ voltage drops across the synchronous rectifiers in the conventional circuit 23 of FIG. 4 as indicated by the waveform labeled $V_{SD}$ in FIG. 8.

Figure 2:
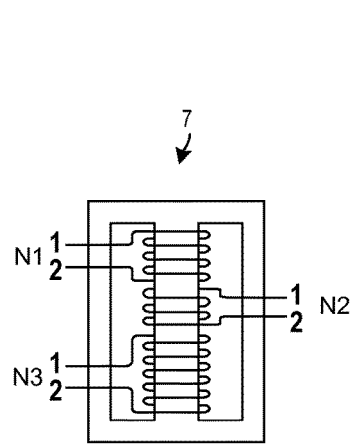
FIG. 2 (Prior Art) is a simplified diagram that illustrates the relationship of the primary, secondary and tertiary windings of the transformer of the AC-to-DC converter circuit of FIG. 17.
Figure 3:
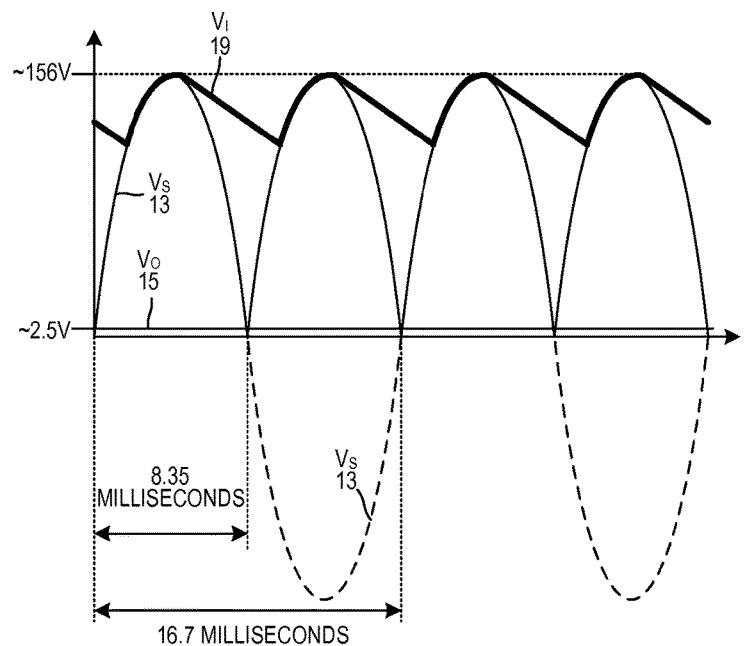
FIG. 3 (Prior Art) is a diagram that illustrates the waveform of the sinusoidal input supply voltage $V_S$ supplied to the AC-to-DC converter circuit of FIG. 1.

In addition to the reduced power loss advantage over the prior art of FIG. 2 as explained above, the novel AC-to-DC converter circuit 50 of FIG. 6 has other advantages. In the conventional circuit of FIG. 4 the secondary winding voltage $V_{N2}$ between $T_2$ and $T_3$ is required to be about ten volts to keep field effect transistor Q3 fully turned on. In the novel AC-to-DC converter circuit 50 of FIG. 6, on the other hand, there is no requirement for the secondary winding voltage $V_{N2}$ between $T_2$ and $T_3$ to keep a field effect transistor turned on, but rather the minimum acceptable value for $V_{N2}$ is determined only by the amount of time available to reset the transformer core. Therefore the secondary winding voltage $V_{N2}$ can be smaller in the novel circuit of FIG. 6 as compared to the conventional circuit of FIG. 4. Accordingly, the number of turns $N_3$ of the tertiary winding can be increased as compared to the conventional circuit. In the waveform labeled $V_{DS,Q1}$ of FIG. 17, the voltage $V_I$ during $T_{idle}$ is the 156 volt peak voltage of the incoming AC signal $V_S$. The magnitude of the voltage 138 is given by $(N_1/N_3)*V_I$. The main switch Q1 104 must have a high enough $V_{DS}$ breakdown withstand voltage to tolerate the maximum $V_{DS}$ with some margin. The $V_{DS}$ breakdown withstand voltage required for the main switch Q1 5 in the conventional AC-to-DC converter circuit 23 of FIG. 4 may, for example, be about 400 volts. In accordance with one novel aspect, the number of turns $N_3$ is larger in the novel AC-to-DC converter circuit 50 of FIG. 6, thereby decreasing the voltage 138. As a consequence, the maximum $V_{DS}$ that the main switch Q1 104 will experience between times $T_2$ and $T_3$ is smaller, and a main switch Q1 104 having a lower $V_{DS}$ breakdown voltage rating (for example, 300 volts) can be employed. Note that the voltage 138 in the $V_{DS,Q1}$ waveform of FIG. 17 is smaller than the corresponding voltage 139 in the waveform labeled $V_{DS,Q1}$ of FIG. 8. Using a main switch that has a more relaxed $V_{DS}$ breakdown withstand voltage rating allows the main switch to have a lower $R_{DS(ON)}$ and this serves to reduce power loss in the novel forward converter circuit as compared to the conventional forward converter circuit.

In addition to the advantages set forth above, there is also another advantage of the circuit of FIG. 6 over the conventional circuit of FIG. 4. The conventional circuit of FIG. 4 cannot operate from both either an incoming 110 volt AC supply voltage or an incoming 220 volt AC supply voltage. If the voltage of the incoming AC supply voltage were to be changed from 110 volts AC to 220 volts AC, then circuit components would have to be changed or the power supply would be damaged. The reason for the damage is that the gate voltage of field effect transistor Q2 in the conventional circuit of FIG. 4 at time $T_1$ has to be adequately high (about ten volts) to ensure that the field effect transistor Q2 is fully on, but yet the gate voltage cannot ever be so high as to destroy the field effect transistor Q2. If the gate voltage (between times $T_2$ and $T_3$) is ten volts when the incoming supply voltage is 110 volts AC, then the gate voltage would be too high if the incoming supply voltage were increased to 220 volts AC. In contrast to the conventional circuit of FIG. 4, in the novel circuit 50 of FIG. 6 the secondary winding voltage $V_{N2}$ between time $T_1$ and time $T_2$ does not control the gate voltage of a field effect transistor. In the novel circuit of FIG. 6, if the secondary winding voltage $V_{N2}$ is high, the gate voltage on a field effect transistor will not be destroyed because the secondary winding voltage $V_{N2}$ does not drive the gate of any field effect transistor. The synchronous rectifiers in the novel circuit of FIG. 6 do not involve field effect transistors, but rather involve bipolar transistors. As a result, the same power supply circuit of FIG. 6 can be operated from either an incoming supply voltage of 110 volts AC or an incoming supply voltage of 220 volts AC, without changing any circuit components in the power supply circuit of FIG. 6.

Figure 18:
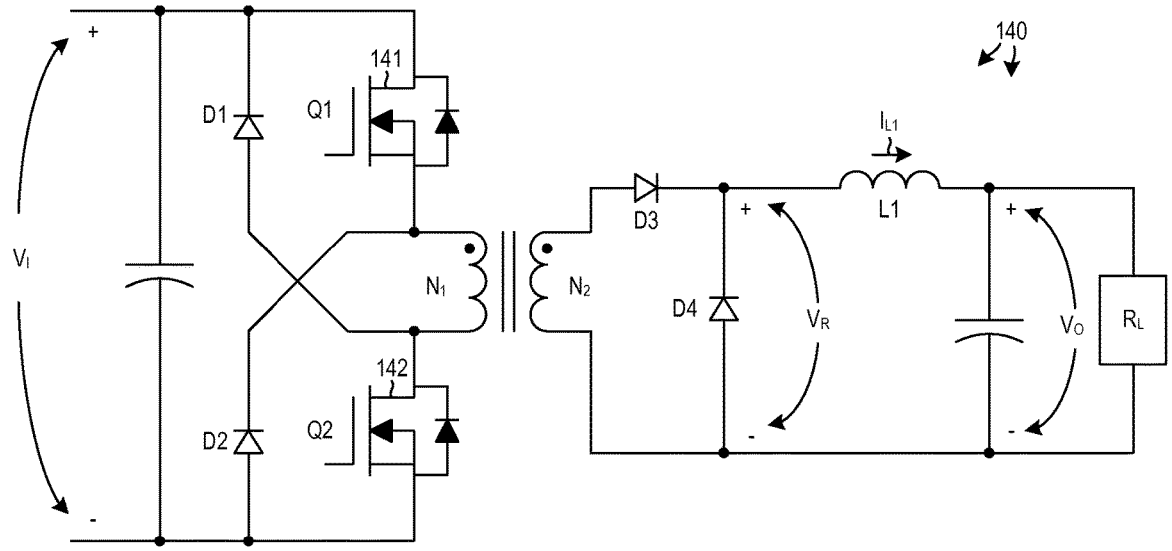
FIG. 18 (Prior Art) is a diagram of a conventional AC-to-DC converter circuit that includes a two-switch forward converter.

FIG. 18 (Prior Art) is a simplified circuit diagram of a conventional AC-to-DC converter circuit 140 that includes a two-switch forward converter circuit. Rather than having just one main switch on the primary side of the converter, the two-switch topology has two main switches 141 and 142.

Figure 5:
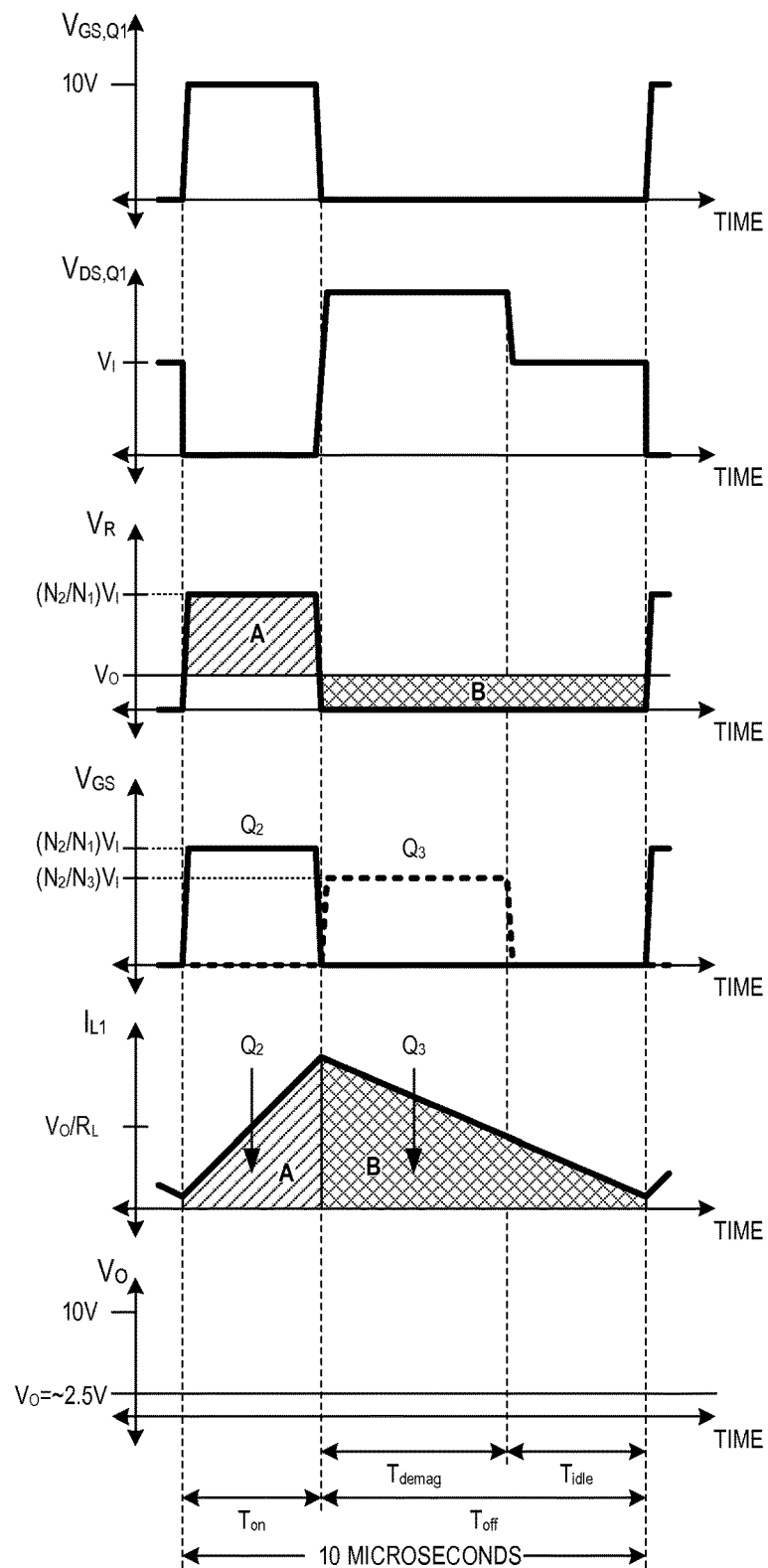
FIG. 5 (Prior Art) is a waveform diagram that illustrates the operation of the AC-to-DC converter circuit of FIG. 4.
Figure 19:
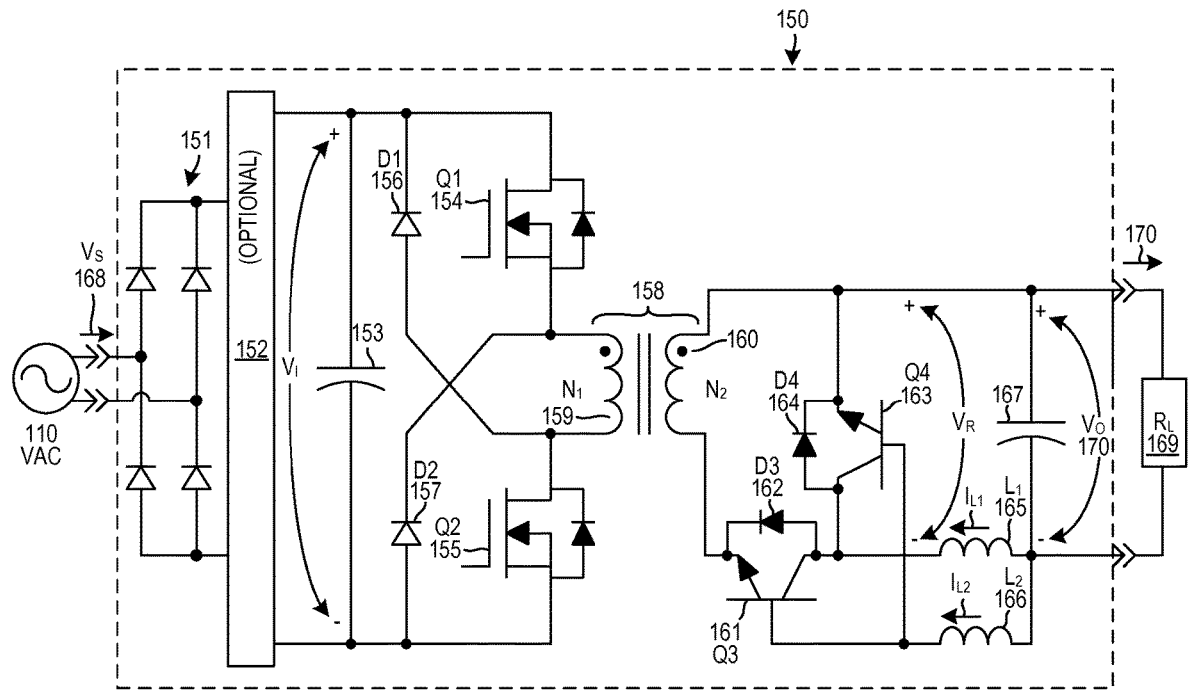
FIG. 19 is a simplified circuit diagram of a novel AC-to-DC converter circuit that includes a two-switch forward converter in accordance with another novel aspect.

FIG. 19 is a simplified circuit diagram of a novel AC-to-DC converter circuit 150 that includes a two-switch forward converter in accordance with another novel aspect. The primary side of the AC-to-DC converter circuit 150 includes a full-bridge rectifier 151, an optional power factor correction circuit 152, an input capacitor 153, a first main switch Q1 154, a second main switch Q2 155, a first diode D1 156, and a second diode D2 157, and the primary winding 159 of a transformer 158. The transformer 158 includes the primary winding 159 and a secondary winding 160. The secondary side of the novel AC-to-DC converter circuit 150 is the same as in the prior embodiment of FIG. 6. The secondary side circuit includes a third bipolar transistor 161, a third diode 162, a fourth bipolar transistor 163, a fourth diode 164, a first inductor L1 165, a second inductor L2 166, and an output capacitor 167, interconnected as shown in FIG. 19. In the illustrated example, the AC-to-DC converter circuit 150 receives a 110 volt RMS AC input supply voltage $V_S$ 168, and supplies a load 169 with a 2.5 volt DC output voltage $V_O$ 170. The switch driver circuitry that drives the main switches is not illustrated but can be conventional for this type of two-switch forward converter topology. In a typical forward converter involving a single main switch, the drain-to-source voltage $V_{DS}$ across the main switch much exceeds $V_I$. See, for example, the waveform labeled $V_{DS,Q1}$ of FIG. 5. In that waveform the $V_{DS}$ voltage across the main switch much exceeds the voltage $V_I$. If the main switch is off, the main switch will have a voltage much greater than $V_I$ between its drain and source. The main switch therefore has to be able to tolerate a $V_{DS}$ breakdown voltage that is much higher than $V_I$. Having to provide a provide main switch having such a high breakdown withstand voltage rating serves to decrease the performance of the main switch.

Figure 20:
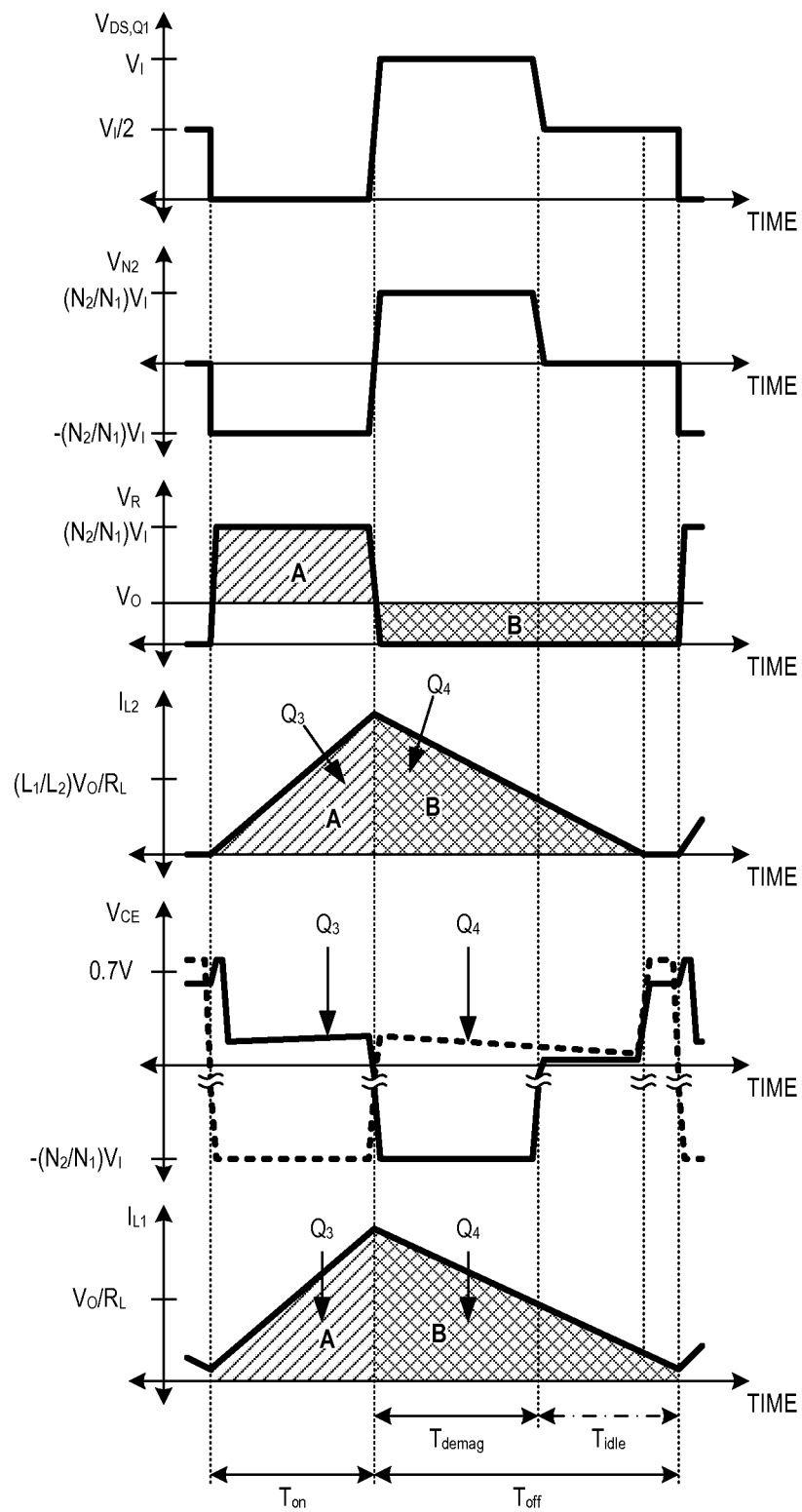
FIG. 20 is a waveform diagram that illustrates an operation of the novel AC-to-DC converter circuit of FIG. 19.

Advantageously, in the two-switch forward converter of FIG. 19, the $V_{DS}$ voltage across each main switch does not much exceed $V_I$. FIG. 20 is a waveform diagram that illustrates operation of the novel two-switch forward converter circuit of FIG. 19. Voltage $V_I$ in this example of approximately 156 volts. Note that neither of the maximum $V_{DS}$ voltages across the Q1 and Q2 main transistors as indicated in the two top waveforms of FIG. 20 much exceeds voltage $V_I$. Accordingly, either less expensive main switches can be used as compared to a single switch topology, or a more efficient AC-to-DC converter circuit can be realized by using transistors for Q1 and Q2 that have lower $R_{DS(ON)}$ values due to more relaxed $V_{DS}$ breakdown withstand voltage requirements on the main switch transistors.

The use of inductive current splitting to drive bipolar transistors in self-driven synchronous rectifiers is not limited to use in AC-to-DC converter circuits involving forward converters. The use of inductive current splitting to drive bipolar transistors in self-driven synchronous rectifiers is also applicable to AC-to-DC converter circuits involving push-pull converters, half-abridge converters, full-bridge converters, and phase shift full bridge converters.

Figure 21:
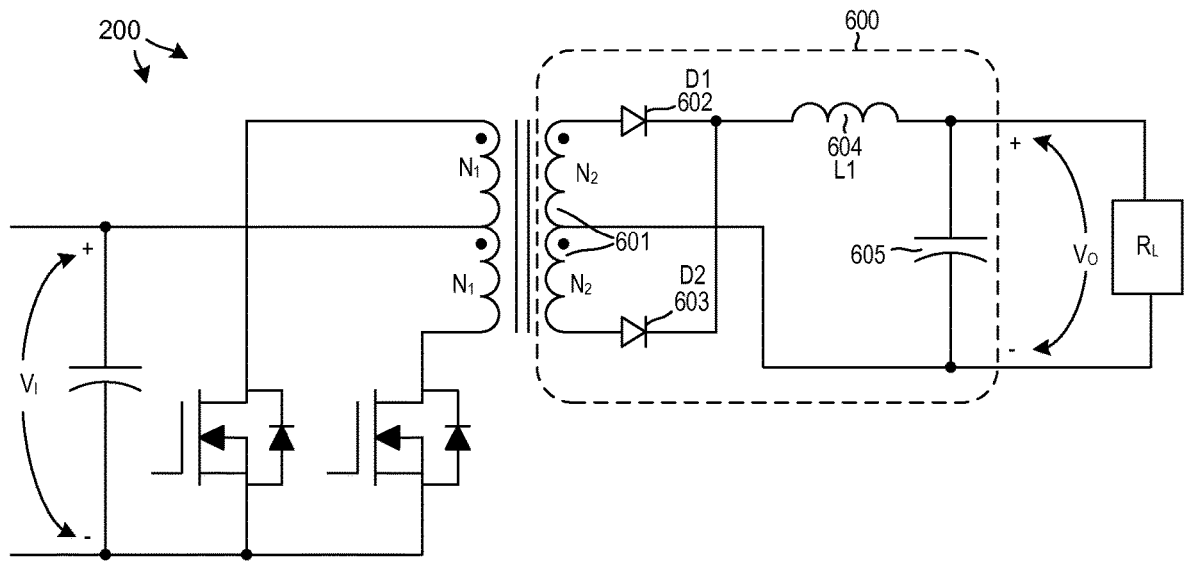
FIG. 21 (Prior Art) is a circuit diagram of a conventional AC-to-DC converter circuit involving a push-pull converter.
Figure 22:
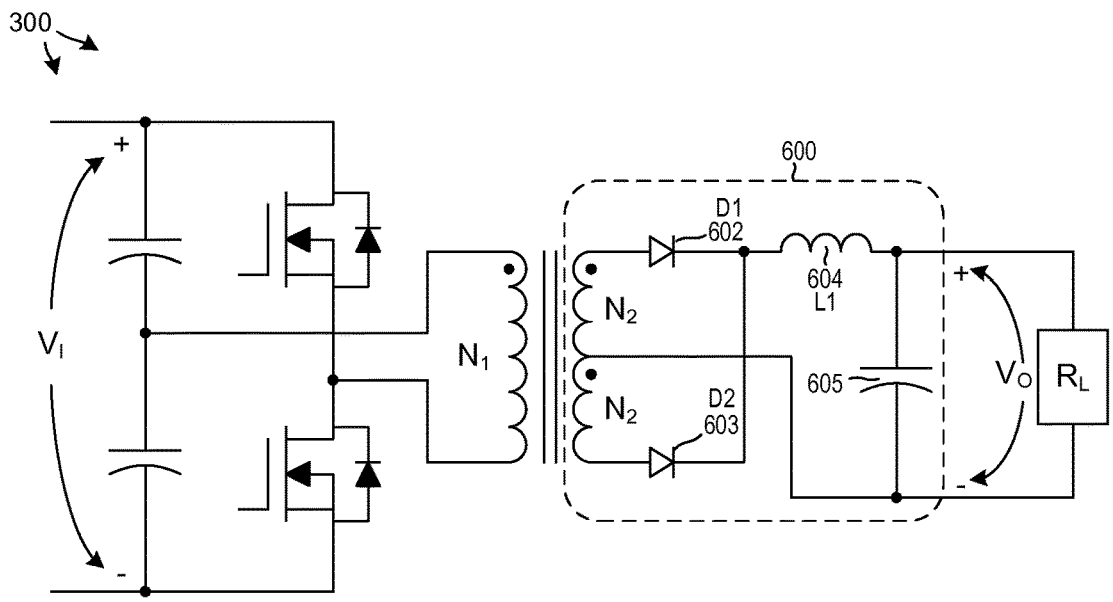
FIG. 22 (Prior Art) is a circuit diagram of a conventional AC-to-DC converter circuit 300 involving a half-bridge converter.
Figure 23:
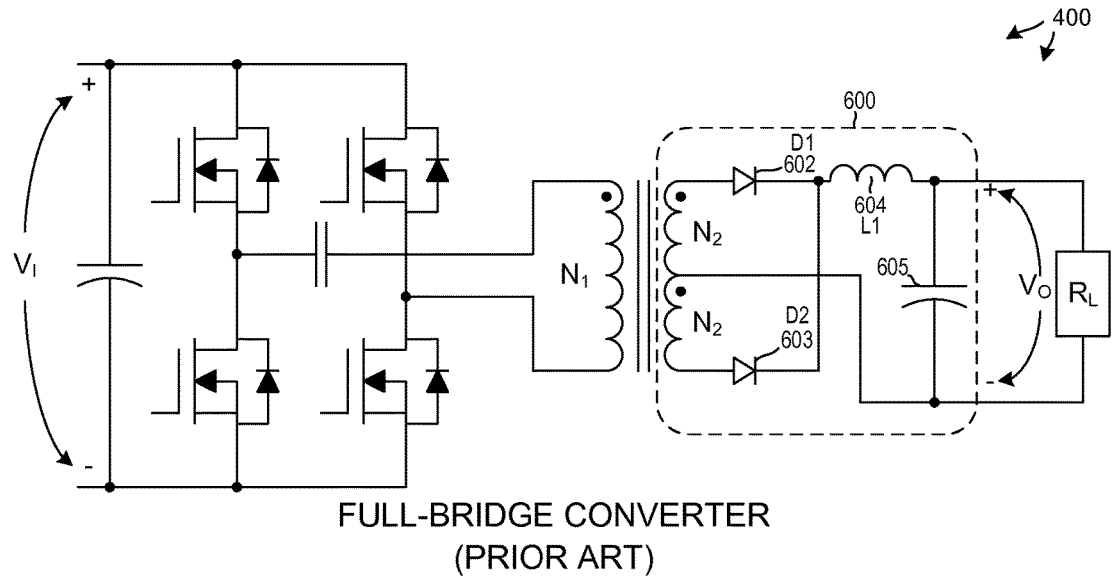
FIG. 23 (Prior Art) is a circuit diagram of a conventional AC-to-DC converter circuit 400 involving a full-bridge converter.
Figure 24:
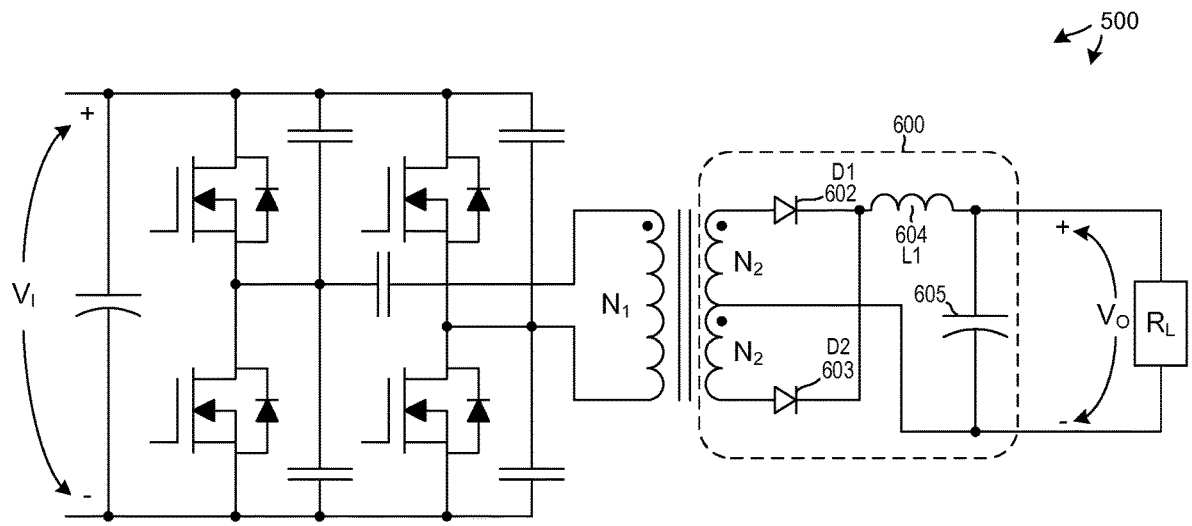
FIG. 24 (Prior Art) is a circuit diagram of a conventional AC-to-DC converter circuit 500 involving a phase shift full bridge converter.
Figure 25:
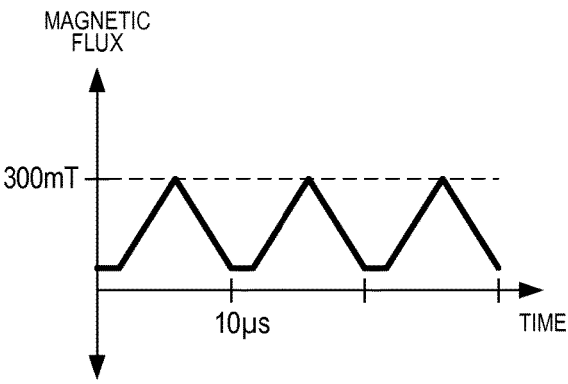
FIG. 25 is a diagram illustrating one-sided transformer core magnetization.
Figure 26:
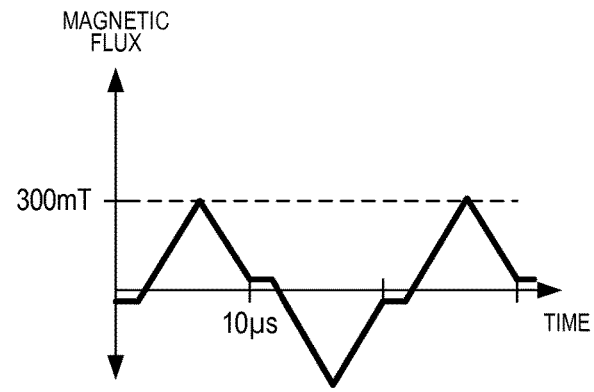
FIG. 26 is a diagram illustrating two-sided transformer core magnetization.

FIG. 21 (Prior Art) is a circuit diagram of a conventional AC-to-DC converter circuit 200 involving a push-pull converter. FIG. 22 (Prior Art) is a circuit diagram of a conventional AC-to-DC converter circuit 300 involving a half-bridge converter. FIG. 23 (Prior Art) is a circuit diagram of a conventional AC-to-DC converter circuit 400 involving a full-bridge converter. FIG. 24 (Prior Art) is a circuit diagram of a conventional AC-to-DC converter circuit 500 involving a phase shift full bridge converter. In each case, the secondary side of the converter is the same circuit 600. Circuit 600 involves a center-tapped secondary winding 601, a first diode D1 602, a second diode D2 603, an inductor L1 604, and an output capacitor 605. Whereas in a forward converter the magnetization of the transformer core is one-sided as shown in FIG. 25, in the circuits of FIGS. 21-24 the magnetization of the transformer core is two-sided as shown in FIG. 26. In the case of one-sided magnetization, the core must be reset as described above to prevent residual magnetization from building up from switching cycle to switching cycle and eventually saturating the core. Despite core resetting circuitry, for a given power output of the converter the core is typically made somewhat larger in order to accommodate a certain amount of residual magnetization and margin and to prevent inadvertent saturation of the core. In the case of two-sided magnetization, on the other hand, any residual magnetization in the core at the end of a switching cycle will be automatically removed in the subsequent switching cycle because the subsequent switching cycle magnetizes the core in the opposite direction. For a given power output of the converter, the core can be smaller if two-sided core magnetization is employed as compared to if one-sided core magnetization is employed. Minimizing the size of the core in this way is especially desirable in high power applications where the required core is large and expensive.

Figure 27:
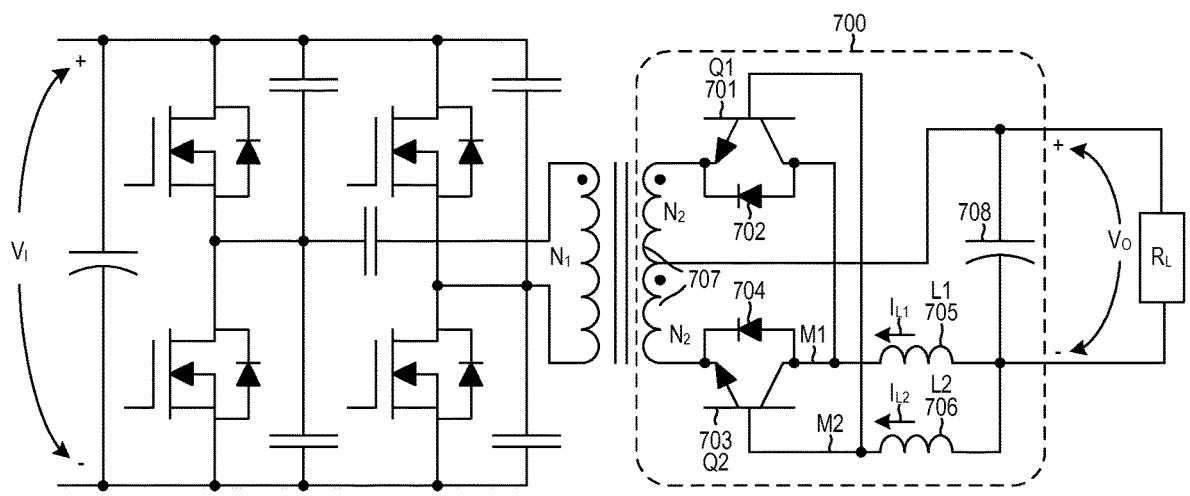
FIG. 27 is a circuit diagram of a novel secondary side circuit that can be used in any one of the circuits of FIGS. 21-24 in accordance with another novel aspect.

In accordance with another novel aspect, the secondary side circuit 600 is replaced with the novel secondary side circuit 700 of FIG. 27. Novel secondary side circuit 700 involves an inductive current splitting circuit that self-drives two bipolar transistor-based synchronous rectifiers. The first bipolar transistor-based synchronous rectifier includes bipolar transistor 701 and diode 702. The second bipolar transistor synchronous rectifier includes bipolar transistor 703 and diode 704. Only one of the synchronous rectifiers conducts current at a time. A common inductive current splitting circuit is shared between the two synchronous rectifiers and supplies the necessary base currents into the bipolar transistors 701 and 703 at the appropriate times. The inductive current splitting circuit involves a first inductor L1 705 and a second inductor L2 706. The overall circuit 700 further includes a center-tapped transformer secondary winding 707 and an output capacitor 708, interconnected as shown in FIG. 27. The emitter of the first bipolar transistor and the cathode of the first diode are coupled together and to a first end of the secondary winding. The emitter of the second bipolar transistor and the cathode of the second diode are coupled together and to a second end of the secondary winding. A first terminal of the output capacitor is coupled to the centertap of the secondary winding. The collectors of the two bipolar transistors and the anodes of the two diodes are all coupled together at a first node $M_1$. The bases of the two bipolar transistors are coupled together at a second node $M_2$. A first inductor of the current splitting inductor pair is coupled between a second terminal of the output capacitor and the first node $M_1$. A second inductor of the current splitting inductor pair is coupled between the second terminal of the output capacitor and the second node $M_2$.

Figure 28:
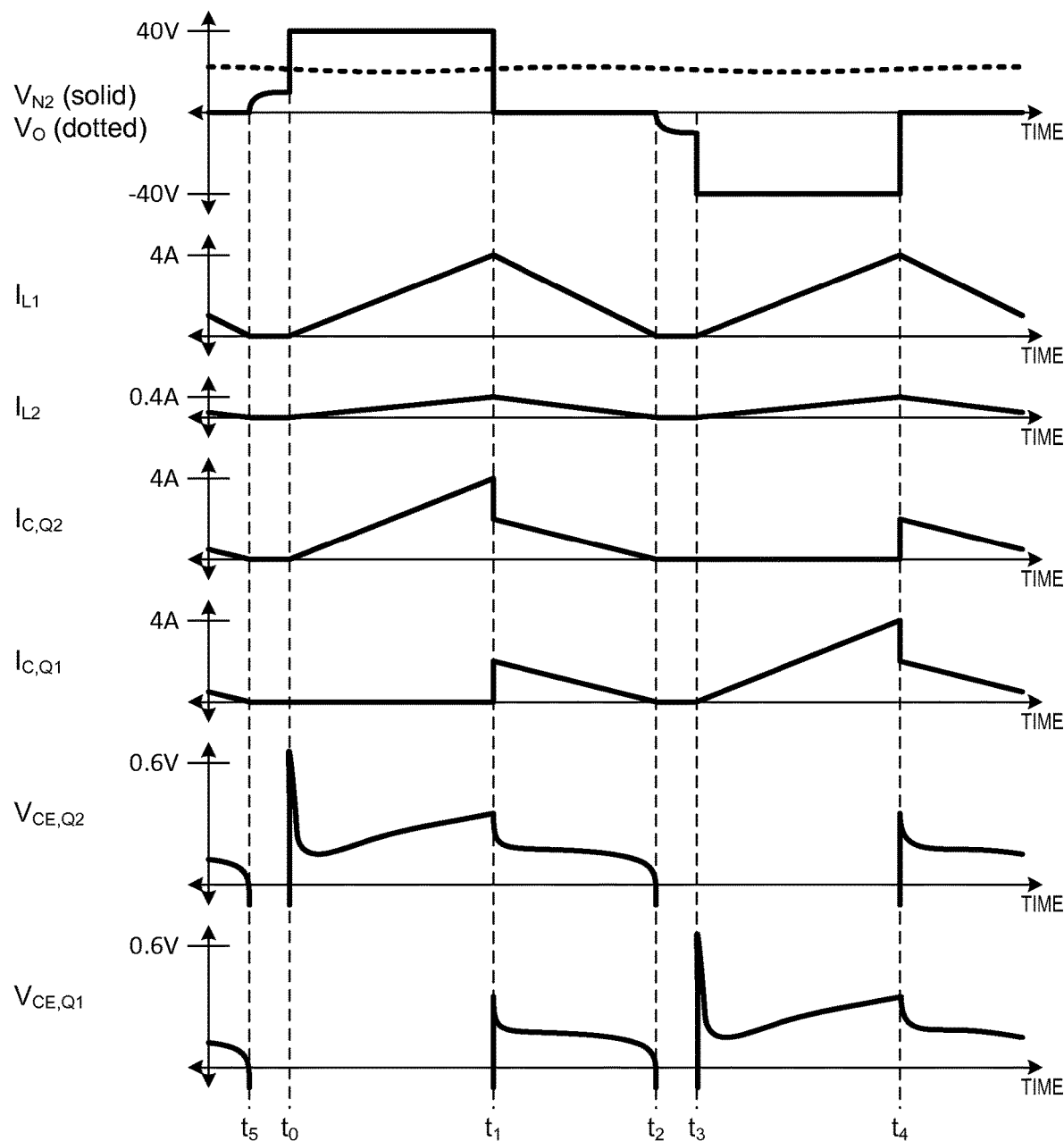
FIG. 28 is a waveform diagram that shows currents and voltages in the novel secondary side circuit of FIG. 27.

FIG. 28 is a waveform diagram that shows currents and voltages in the circuit 700 as the circuit operates. Operation is substantially the same regardless of which one of the circuits of FIGS. 21-24 the circuit 700 is a part of. As compared to the conventional second side circuit 600 where current flowing through diodes D1 602 and D2 603 experiences a relatively large voltage drop of about one volt, in the novel circuit 700 the voltage drop across the bipolar transistor synchronous rectifiers is substantially smaller. The $V_{CE,Q2}$ and $V_{CE,Q1}$ waveforms show the voltage drop across one of the bipolar synchronous rectifiers has an average magnitude of about 0.3 volts when a forward current is flowing through the synchronous rectifier. Due to this smaller voltage drop, the novel secondary side circuit 700 of FIG. 27 exhibits less power loss as compared to the conventional secondary side circuit 600 of FIGS. 21-24.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
providing a pair of self-driven BJT (Bipolar Junction Transistor) synchronous rectifiers and a pair of inductors in a secondary side of a switching converter circuit, wherein each of the self-driven BJT synchronous rectifiers includes a bipolar transistor and a diode disposed in parallel with the bipolar transistor such that the anode of the diode is coupled to a collector of the bipolar transistor and such that a cathode of the diode is coupled to an emitter of the bipolar transistor, wherein a base terminal of a first bipolar transistor of a first synchronous rectifier is connected to a base terminal of a second bipolar transistor of a second synchronous rectifier, wherein the pair of inductors comprises a first inductor having a first end and a second end and a second inductor having a first end and a second end, wherein the second end of the first inductor is coupled to a first collector of the first bipolar and a second collector of the second bipolar transistors, wherein the first end of the second inductor is coupled to the first end of the first inductor, and wherein the second end of the second inductor is coupled to the base terminal of the first bipolar transistor and the base terminal of the second bipolar transistor.

2. A circuit comprising:
a transformer winding having a center tap; and
means for conducting a charging current through the transformer winding during a first portion of a switching cycle and then for conducting a free-wheeling current during a second portion of the switching cycle such that a forward voltage drop across the means when the means is conducting current during the first and second portions of the switching cycle is substantially less than 0.7 volts on average, and wherein the means includes a pair of input current terminals and no field effect transistor, and
an output capacitor having a first terminal connected to the center tap and a second terminal connected to the pair of input current terminals,
wherein the transformer winding is a secondary winding of a transformer, and wherein the means comprises a pair of current splitting inductors connected to the pair of input current terminals, respectively, two bipolar transistors, and two diodes,
wherein a current splitting inductor of the pair of current splitting inductors comprises a first end, connected to the second terminal of the output capacitor, and a second end connected to a base terminal of a first bipolar transistor of the two bipolar transistors, and a base terminal of a second bipolar transistor of the two bipolar transistors.

3. The circuit of claim 2, wherein the first bipolar transistor and a first diode are connected to form a first synchronous rectifier and the second bipolar transistor and a second diode are connected to form a second synchronous rectifier.

4. The circuit of claim 2, wherein an emitter of the first bipolar transistor is connected to a cathode of a first diode and an emitter of the second bipolar transistor is connected to a cathode of a second diode.

5. The circuit of claim 2, wherein a collector of the first bipolar transistor is connected to anode of a first diode and a collector the second bipolar transistor is connected to an anode of a second diode.

6. The circuit of claim 2, wherein collectors of the first bipolar transistor and second bipolar transistor are connected to a second current input terminal.

7. The circuit of claim 2, further comprising:
a primary transformer winding; and
means for switching current flow in the primary transformer winding at a frequency of at least ten kilohertz.

8. The circuit of claim 7, wherein the circuit comprises an AC-to-DC forward converter that receives a 110 volt AC supply voltage, and wherein the means for switching has a breakdown withstand voltage rating of not more than 300 volts.

9. The circuit of claim 8, wherein the AC-to-DC forward converter is operable from either the 110 volt AC supply voltage or a 220 volt AC supply voltage.

10. The circuit of claim 2, wherein the first bipolar transistor and a first diode are parts of a first semiconductor die, and wherein the second bipolar transistor and a second diode are parts of a second semiconductor die.

11. The circuit of claim 2, wherein the first bipolar transistor has an emitter-to-collector breakdown withstand voltage that exceeds twenty volts and an emitter-to-base reverse breakdown withstand voltage that exceeds twenty volts, and wherein the second bipolar transistor has an emitter-to-collector breakdown withstand voltage that exceeds twenty volts and an emitter-to-base reverse breakdown withstand voltage that exceeds twenty volts.

12. The circuit of claim 2, wherein a first inductor has an inductance, wherein a second inductor has an inductance, and wherein the inductance of the second inductor is at least five times the inductance of the first inductor.

* * * * *